(12) United States Patent
Maeda et al.

(10) Patent No.: US 12,521,892 B2
(45) Date of Patent: Jan. 13, 2026

(54) INFORMATION PROCESSING APPARATUS, INFORMATION PROCESSING METHOD, DISPLAY APPARATUS, DISPLAY METHOD, ROBOT SYSTEM, ARTICLE PRODUCTION METHOD, PROGRAM, AND STORAGE MEDIUM

(71) Applicant: CANON KABUSHIKI KAISHA, Tokyo (JP)

(72) Inventors: Yasuharu Maeda, Kanagawa (JP); Hironobu Sasaki, Kanagawa (JP); Satoshi Sugaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 17/839,324

(22) Filed: Jun. 13, 2022

(65) Prior Publication Data

US 2022/0395985 A1 Dec. 15, 2022

(30) Foreign Application Priority Data

Jun. 14, 2021 (JP) ................. 2021-098470

(51) Int. Cl.
*G06T 1/00* (2006.01)
*B25J 9/16* (2006.01)
*B25J 13/06* (2006.01)
*G06F 3/04847* (2022.01)
*G06F 3/14* (2006.01)

(52) U.S. Cl.
CPC ............. *B25J 13/06* (2013.01); *B25J 9/1664* (2013.01); *G06F 3/04847* (2013.01); *G06F 3/14* (2013.01)

(58) Field of Classification Search
CPC ........ B25J 13/06; B25J 9/1664; B25J 9/1671; G06F 3/04847; G06F 3/14
See application file for complete search history.

(56) References Cited

U.S. PATENT DOCUMENTS

| | | | | |
|---|---|---|---|---|
| 2013/0311154 | A1* | 11/2013 | Atohira | G06T 13/20 703/6 |
| 2016/0332297 | A1* | 11/2016 | Sugaya | B25J 9/1671 |
| 2017/0120449 | A1* | 5/2017 | Matsunami | B25J 9/1676 |
| 2018/0361575 | A1* | 12/2018 | Oumi | B25J 9/1664 |
| 2020/0094408 | A1* | 3/2020 | Yui | B25J 9/1664 |
| 2021/0170603 | A1* | 6/2021 | Kotlarski | B25J 13/006 |
| 2022/0371195 | A1* | 11/2022 | Lee | B25J 9/1697 |

FOREIGN PATENT DOCUMENTS

| | | | | |
|---|---|---|---|---|
| EP | 1516704 | A2 * | 3/2005 | ........ G05B 19/4061 |
| JP | S59075309 | A | 4/1984 | |
| JP | H05043201 | U | 6/1993 | |
| JP | H05324042 | A | 12/1993 | |
| JP | H09141582 | A | 6/1997 | |
| JP | 2003117863 | A | 4/2003 | |
| JP | 2006000954 | A | 1/2006 | |

(Continued)

*Primary Examiner* — Masud Ahmed
(74) *Attorney, Agent, or Firm* — Canon U.S.A., Inc. IP Division

(57) ABSTRACT

An information processing apparatus includes a display unit configured to display information on an operation of a robot, and a setting unit configured to set a trajectory of a movement related to the operation of the robot to be displayed, wherein the set trajectory can be made for a part of the trajectory.

27 Claims, 26 Drawing Sheets

(56) References Cited

FOREIGN PATENT DOCUMENTS

| | | | |
|---|---|---|---|
| JP | 2009119589 | A | 6/2009 |
| JP | 2011043874 | A | 3/2011 |
| JP | 2013240849 | A | 12/2013 |
| JP | 2021026309 | A | 2/2021 |
| WO | 9711416 | A1 | 3/1997 |
| WO | 2011/080882 | A1 | 7/2011 |

* cited by examiner

INFORMATION PROCESSING APPARATUS, INFORMATION PROCESSING METHOD, DISPLAY APPARATUS, DISPLAY METHOD, ROBOT SYSTEM, ARTICLE PRODUCTION METHOD, PROGRAM, AND STORAGE MEDIUM

BACKGROUND

Field of the Disclosure

The present disclosure related to an information processing apparatus, an information processing method, a display apparatus, a display method, a robot system, an article production method, a program, and a storage medium.

Description of the Related Art

There is known a simulation apparatus capable of training a robot and/or generating a robot program on a computer. In such a simulation apparatus, it is possible to operate a 3D model representing a robot on a computer according to training data and a robot program, and thus a user can understand, in advance, how the robot will move. In a case where a task such as coating, welding, or the like with a tool attached to a robot is simulated, a user may want to see how the tool moves along a trajectory. Japanese Patent Laid-Open No. 2013-240849 discloses a method of displaying a trajectory of a specific point (a specific part) of a robot that will occur when the robot is operated according to a robot program.

SUMMARY

In an aspect, the present disclosure provides an information processing apparatus including a display unit configured to display information on an operation of a robot, and a setting unit configured to set a trajectory of a movement related to the operation of the robot to be displayed, wherein the set trajectory can be made for a part of the trajectory.

Further features of the present disclosure will become apparent from the following description of exemplary embodiments with reference to the attached drawings.

DESCRIPTION OF THE EMBODIMENTS

The technique disclosed in Japanese Patent Laid-Open No, 2013-240849 has a problem that it is not allowed to display the trajectory for a specific movement of interest of the robot. In general, a robot does not always perform a single operation such as coating, welding, or the like but also performs another operation such as moving to a position (an approach operation) where a particular operation is to be started. When a whole movement trajectory is displayed on a computer, it may be difficult for a user to grasp a specific part of the trajectory that the user is interested in.

In view of the above problems, the present disclosure provides an information processing apparatus capable of displaying a trajectory related to a specific movement.

Embodiments of the present disclosure are described below with reference to the accompanying drawings. It should be noted that the embodiments described below are merely examples. It is apparent for those skilled in the art that many changes or modifications are possible without departing from the spirit and the scope of the present disclosure. Also note that numerical values employed in the embodiments described below are merely example, and the present disclosure is not limited to those examples. In drawings referred to in the following description, arrows X, Y, and Z indicate a global coordinate system of a robot system. A 3-dimensional XYZ, coordinate system is generally used to represent a world coordinate system of a whole installation environment. In addition, a local coordinate system may be appropriately used for a robot hand, a finger, a joint, etc. for convenience of control. In the embodiments described below, the world coordinate system, that is, the global coordinate system, is represented by the XYZ coordinate system, and the local coordinate system is represented by the xyz coordinate system.

First Embodiment

Figure 1:
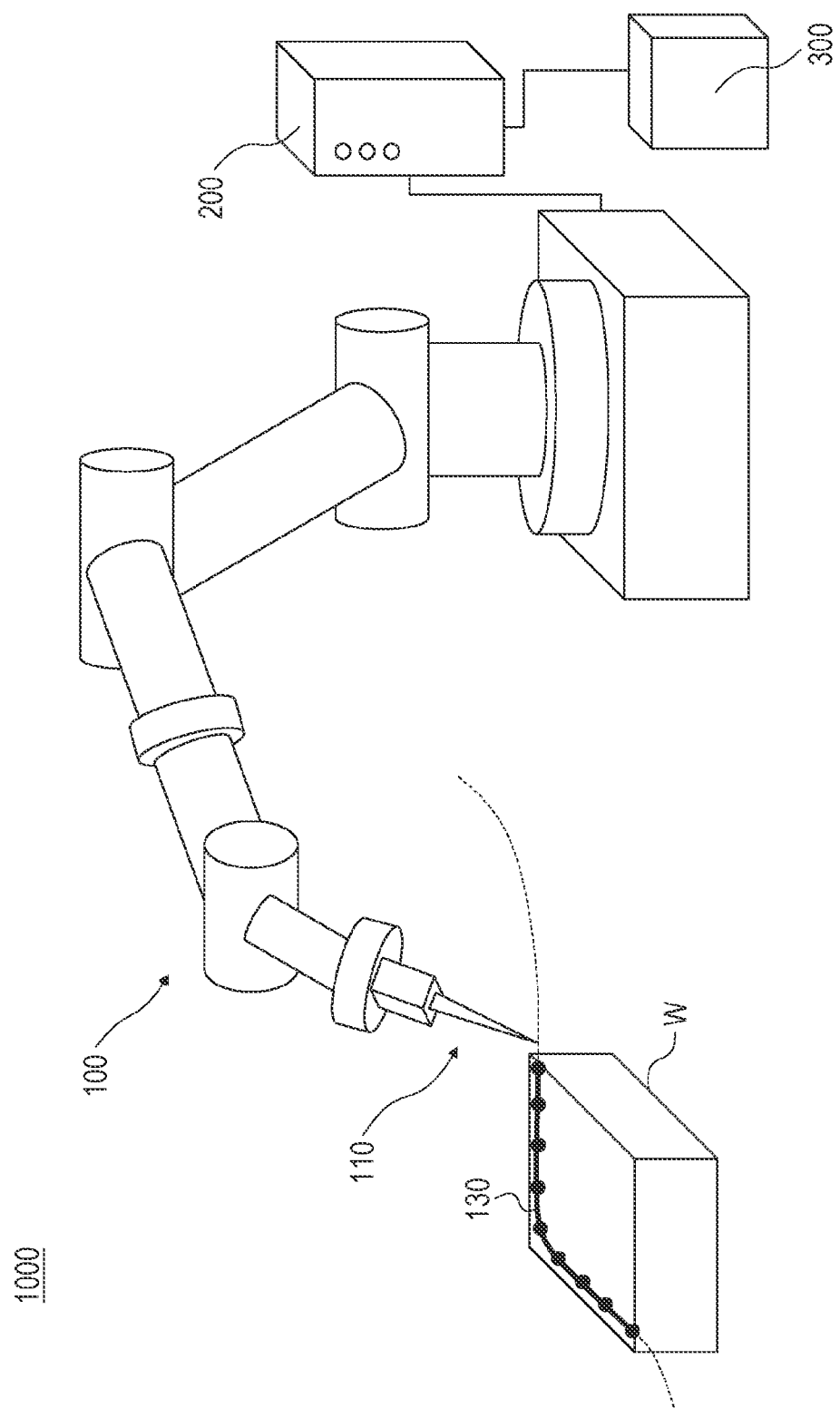
FIG. 1 is a schematic diagram illustrating a robot system according to one or more aspects of the present disclosure.

A first embodiment of the present disclosure is described in detail below with reference to drawings. FIG. 1 is a diagram illustrating a robot system 1000 according to the first embodiment. The robot system 1000 includes a robot arm body 100 as a real machine, a control apparatus 200, and an information processing apparatus 300.

The robot arm body 100 is an industrial robot used to produce articles. The robot arm body 100 has a tool 110, which is an example of an end effector. The robot arm body 100 is installed at a specific position on, for example, a pedestal or a floor surface (not shown).

A work W, which is a target object, is positioned, close to the robot arm body 100, on a pedestal or a floor surface (not shown). The tool 110 is a tool for ejecting a coating material onto the work W Using the tool 110, it is possible to apply the coating material to the work W along a trajectory 130.

The control apparatus 200 controls the robot arm body 100 according to operation information of the robot arm body 100, that is, training data indicating a robot program. The control apparatus 200 acquires the training data from the information processing apparatus 300. The training data includes command information and training point information. In the present embodiment, the robot arm body 100 is operated by the control apparatus 200 based on the training data so as to perform a process using the work W and a coating material such that the coating material is applied to the work W thereby obtaining, as a product, a coated work W. Thus, the robot am body 100 can produce an article in the above-described manner.

The information processing apparatus 300 is realized by a computer so as to function as a training apparatus, that is, a simulator. In the present embodiment, the information processing apparatus 300 generates training data by a computer simulation, that is, offline training. The training data generated by the information processing apparatus 300 is output to the control apparatus 200, There is no particular restriction on a method of outputting the training data to the control apparatus 200. For example, the training data generated by the information processing apparatus 300 may be output to the control apparatus 200 via a wired communication or wireless communication, or via a storage apparatus (not shown).

Figure 2:
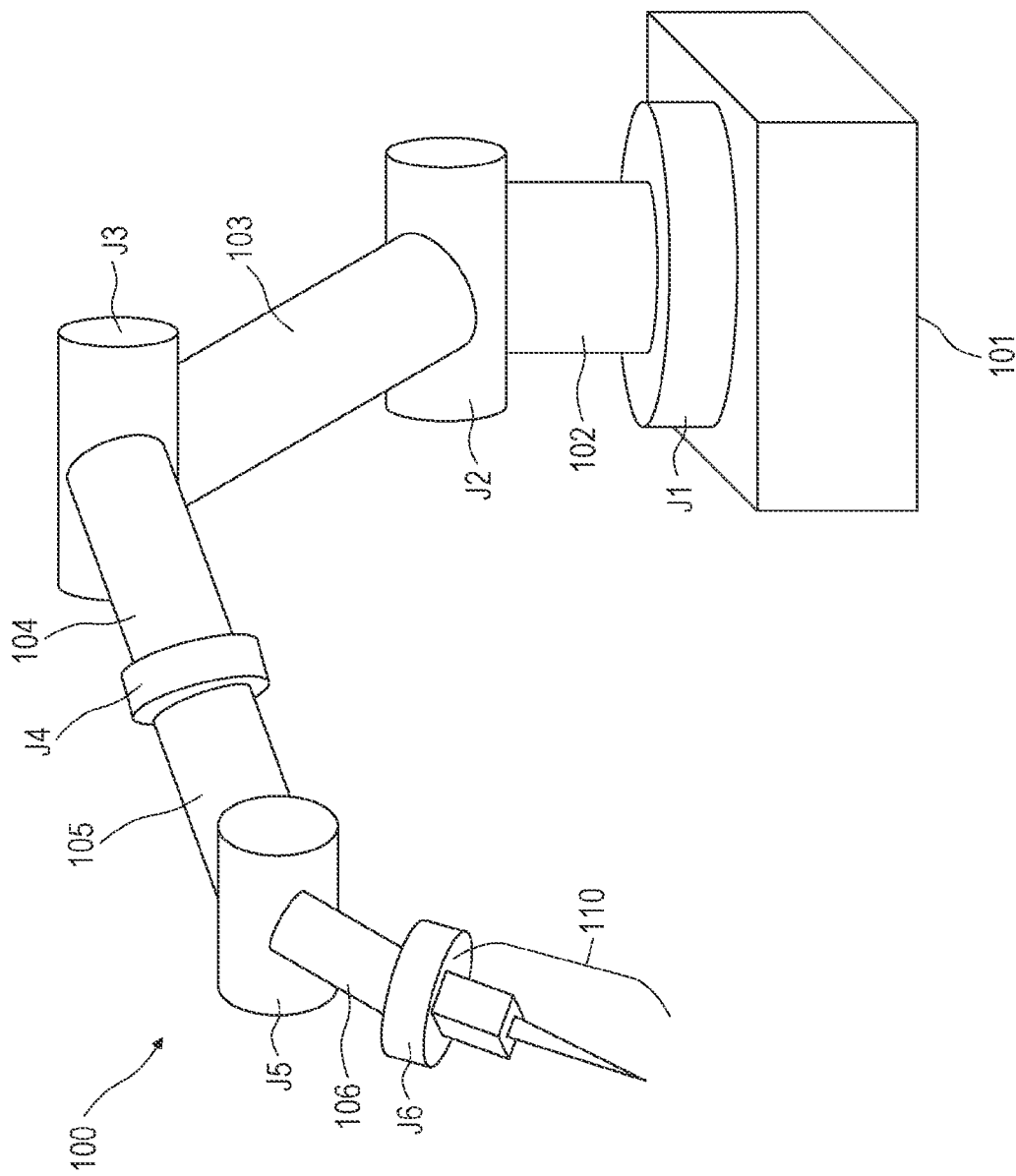
FIG. 2 is a schematic diagram illustrating a robot arm body according to one or more aspects of the present disclosure.

FIG. 2 is a diagram illustrating the robot arm body 100 and the tool 110 according to the present embodiment. The robot arm body 100 is, for example, a vertical articulated robot arm, A base 101 disposed at an end of the robot arm body 100 is fixed to a pedestal or a floor surface (not shown). The tool 110 is attached to a joint link J6 at a tip of the robot arm body 100. The robot arm body 100 includes joint links J1 to J6 respectively having driving sources for driving the base 101, a plurality of links 102 to 106, and tool 110, The base 101, the links 102 to 106, and the tool 110 are connected via the joint links J1 to J6 such that the links 102 to 106 and the tool 110 can be rotated by the joints J1 to J6.

A motor (not shown) functioning as a power source is provided in each of the joint links J1 to J6. The motors (not shown) provided in the respective joint links J1 to J6 rotate the links 102 to 106 and the tool 110 in circumferential directions of the respective joint links J1 to J6 thereby making it possible for the robot arm body 100 to take various postures.

The tool 110 is configured to eject a coating material from the tip thereof. Inside the robot arm body 100, there is provided a tube (not shown) for transporting the coating material such that the coating material can be moved inside the tube by a pressurizer (not shown). Although the coating operation is taken as an example of an operation performed by the robot arm body 100 according to the present embodiment, other operations such as welding using laser light may be performed using the robot arm body 100.

Figure 3:
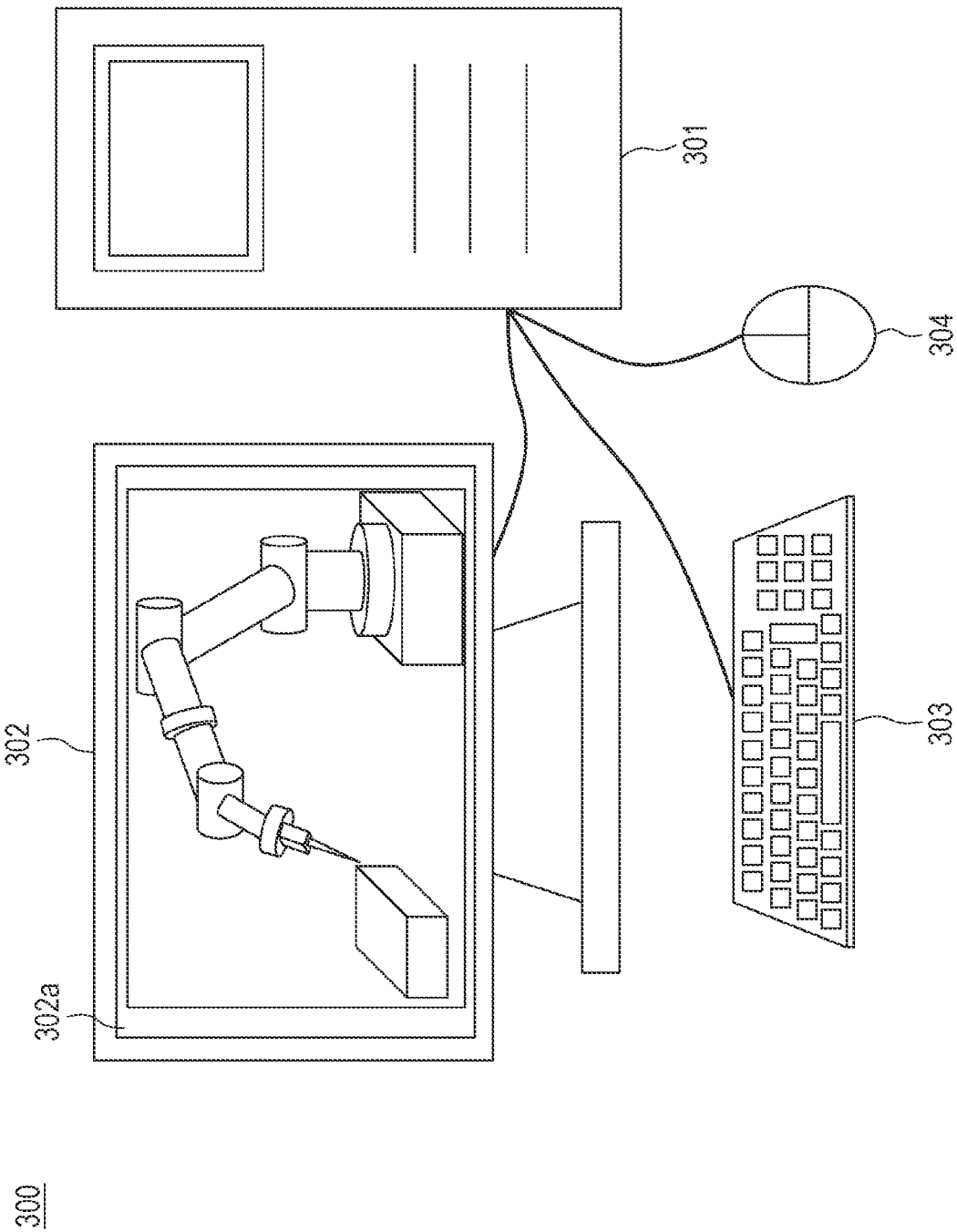
FIG. 3 is a schematic diagram illustrating an information processing apparatus according to one or more aspects of the present disclosure.

FIG. 3 is a diagram illustrating the information processing apparatus 300 according to the embodiment. The information processing apparatus 300 includes a main apparatus part 301, a display 302, which is an example of a display apparatus, connected to the main apparatus part 301, and a keyboard 303 and a mouse 304, which are examples of input apparatuses, connected to the main apparatus part 301. In the following description, it is assumed by way of example but not limitation that the information processing apparatus 300 is a general-purpose computer realized by a desktop personal computer (PC). The information processing apparatus 300 may be a general-purpose computer such as a laptop PC, a tablet PC, or a smartphone, a teaching pendant, or a computer dedicated to the simulator. The information processing apparatus 300 may be incorporated in the control apparatus 200. That is, the control apparatus 200 may have a simulator function.

On the display 302 for displaying, an image for use by a user to edit a program for training or controlling the robot system 1000 is displayed in a display area 302a of the display 302. Furthermore, to confirm whether the robot system 1000 operates correctly according to the training or edited program, an environment similar to that shown in FIG. 1 is displayed in the virtual space.

Figure 4:
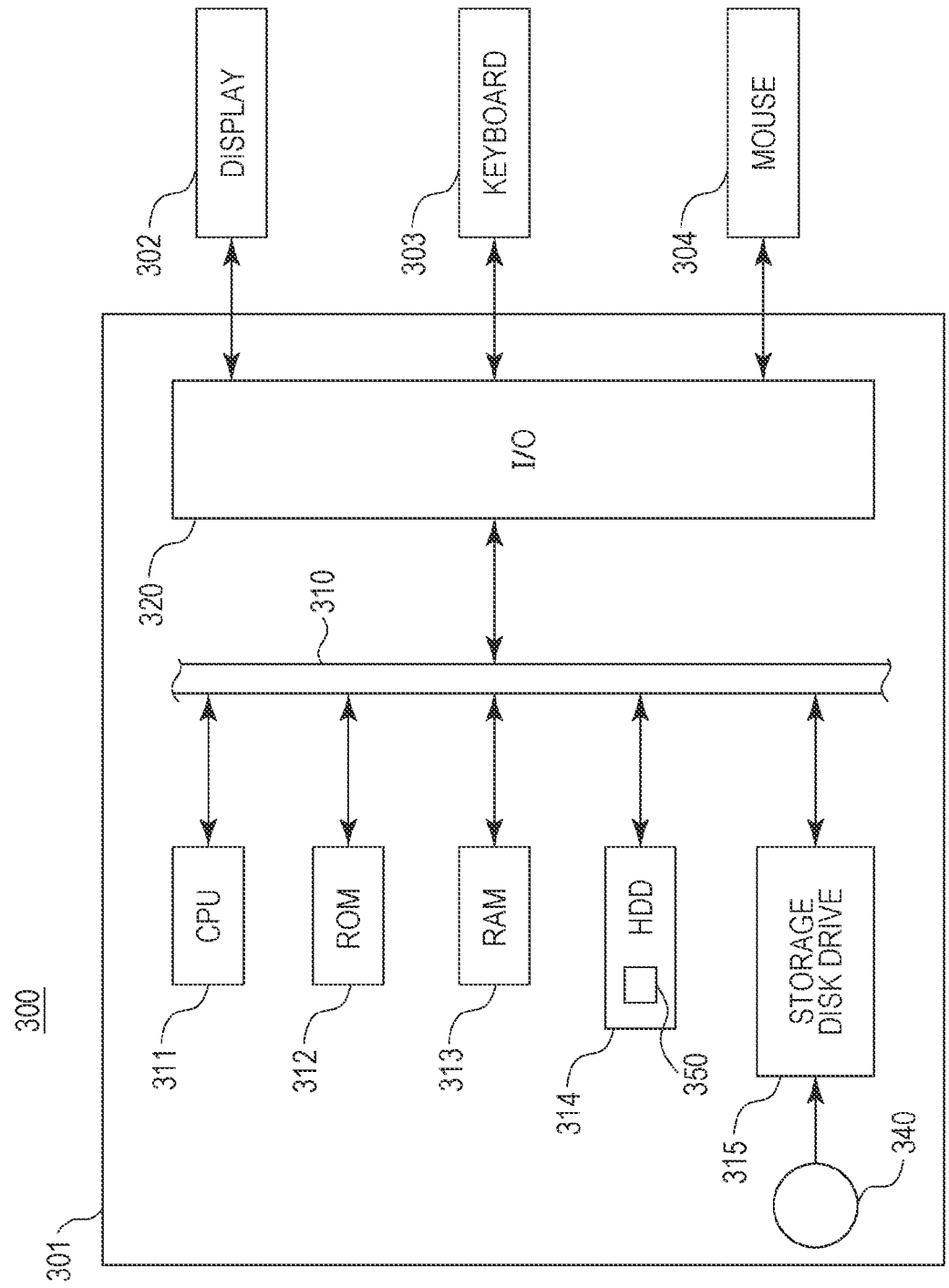
FIG. 4 is a control block diagram of an information processing apparatus according to one or more aspects of the present disclosure.

FIG. 4 is a control block diagram of the information processing apparatus 300 according to the present embodiment. The main apparatus part 301 of the information processing apparatus 300 includes a CPU (Central Processing Unit) 311 which is a processor. The main apparatus part 301 includes, as storage units, a ROM (Read Only Memory) 312, a RAM (Random Access Memory) 313, and an HDD (Hard Disk Drive) 314. The main apparatus part 301 further includes a storage disk drive 315 and an I/O 320 serving as an input/output interface. The CPU 311, the ROM 312, the RAM 313, the HDD 314, the storage disk drive 315, and the I/O 320 are connected to each other via a bus 310 so as to be able to communicate with each other.

The ROM 312 is a non-temporary storage apparatus. The ROM 312 stores a basic program which is read by the CPU 311 when the computer starts up. The RAM 313 is a temporary storage apparatus used by the CPU 311 in performing arithmetic processing. The HDD 314 is a non-temporary storage apparatus configured to store various data such a result of arithmetic processing performed by the CPU 311. In the present embodiment, a program 350 is stored in the HDD 314. The program 350 is application software. By executing the program 350, the CPU 311 functions as an information processing unit capable of simulating a behavior of a virtual robot and a virtual work in a virtual environment, as will be described later.

The storage disk drive 315 is capable of reading various data, programs, and the like stored on a storage disk 340. The I/O 320 functions as an interface with the outside. The display 302, the keyboard 303, and the mouse 304 are connected to the I/O 320. The display 302 displays, under the control of the CPU 311, an image serving as a user interface and an image reflecting information input by a user using the keyboard 303 and/or the mouse 304, The training data including information related to the training point is generated by the CPU 311 that executes the program 350.

In the present embodiment, the computer-readable non-temporary storage medium is the HDD 314, and the program 350 is stored in the HDD 314, but this is merely by way of example. The program 350 may be stored in any storage medium as long as it is a computer-readable non-temporary storage medium. As the storage medium for supplying the program 350 to the computer, for example, a flexible disk, an optical disk, a magneto-optical disk, a magnetic tape, a non-volatile memory, or the like may be used.

Figure 5:
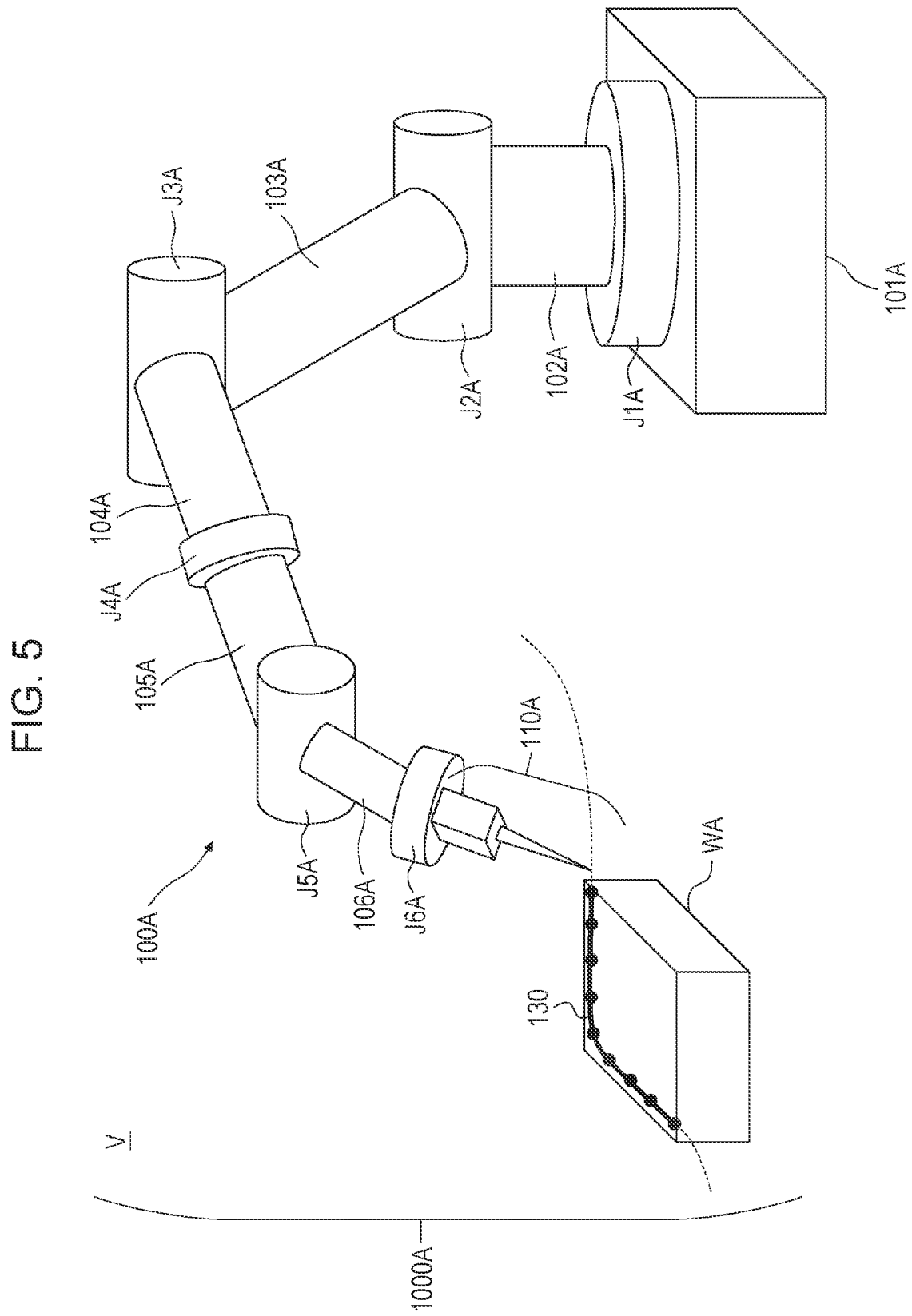
FIG. 5 is a diagram illustrating a virtual space according to one or more aspects of the present disclosure.

FIG. 5 is a diagram illustrating a virtual space V simulated by the information processing apparatus 300 according to the embodiment. The CPU 311 defines the virtual space V shown in FIG. 5 as a virtual environment. A virtual object in the virtual space V is defined by three-dimensional model data, for example, CAD data. In FIG. 5, for convenience, the virtual object is visualized and shown as a structure.

The virtual object defined in the virtual space V shown in FIG. 5 is described below. A virtual robot system 1000A is defined in the virtual space V. The virtual robot system 1000A is defined by three-dimensional model data simulating the robot arm body 100, the tool 110, and the work W shown in FIG. 1. A virtual robot arm body 100A includes, as a plurality of parts, a virtual base 101A, a plurality of virtual links 102A to 106A, a plurality of virtual joint links J1 to J6, and a virtual tool 110A. The virtual links 102A to 106A are defined so as to be rotatable by the respective virtual joint links J1A to J6A such that the virtual robot arm body 100A can operate in the same manner as the robot arm body 100 shown in FIG. 1, The virtual tool 110A is an example of a virtual end effector, and in the present embodiment, it is also an example of a predetermined part.

Figure 6:
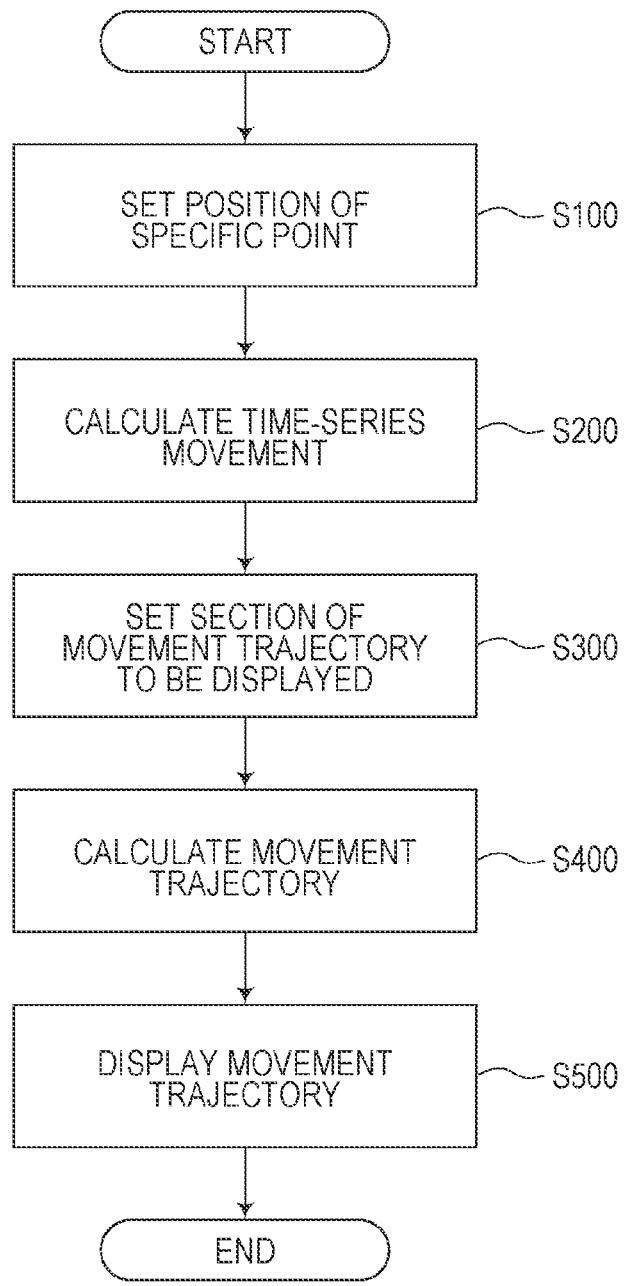
FIG. 6 is a flowchart according to one or more aspects of the present disclosure.

In the virtual space V, a virtual work WA is defined at a location close to the virtual robot arm body 100A by three-dimensional model data so as to simulate the work W shown in FIG. 1. The CPU 311 simulates a coating operation in which the virtual robot arm body 100A applies a coating material to the virtual work WA while ejecting the coating material from the ejection tip of the virtual tool 110A along the trajectory 130. The virtual space V shown in FIG. 5 is displayed as a still image or a moving image on a display screen of the display 302 shown in FIG. 3, FIG. 6 is a flowchart of an information processing method according to the present embodiment. The CPU 311 executes steps S100 to S500 according to the program 350. As a result, the CPU 311 generates training data that is a robot program, and outputs the generated training data to the control apparatus 200.

First, in step S100, setting is made on the position of a specific point to be displayed as a trajectory of the movement of the virtual robot arm body 100A. When a robot is trained, it is common to use a coordinate system called a tool coordinate system, and thus in the present embodiment, the position of the tool coordinate system is treated as the position of the specific point. In the present embodiment, the tool coordinate system is set at the tip (from which a coating material is ejected) of the virtual tool 110A.

Figure 7:
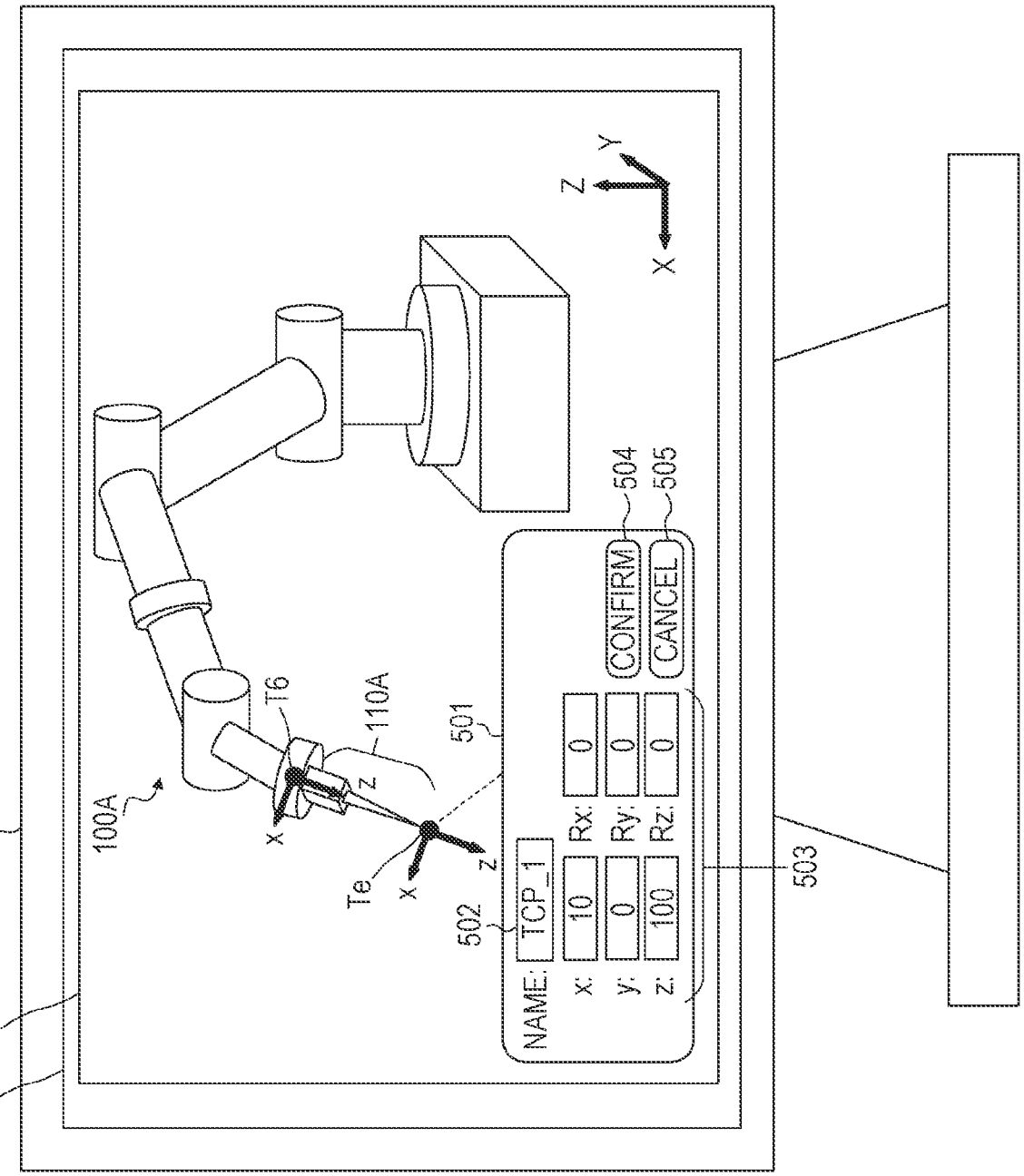
FIG. 7 is a diagram illustrating an example of a virtual space screen according to one or more aspects of the present disclosure.

FIG. 7 shows a virtual space screen 500 which is displayed in the display area 302a of the display 302 when the virtual robot arm body 100A is simulated. When the CPU 311 starts executing the program 350, the CPU 311 functions as a simulator. In step S100, the CPU 311 displays the virtual space screen 500 in the display area 302a of the display 302.

In FIG. 7, when the virtual tool 110A is clicked with the mouse 304, 3D-model arrows indicating the position and the orientation of the tool coordinate system Te are displayed in the virtual space. When the tool coordinate system Te is clicked with the mouse 304, a tool coordinate system setting box 501 is displayed. In the tool coordinate system setting box 501, a name input box 502 for describing the name of the tool coordinate system is displayed. Furthermore, a position/orientation input box group 503 is displayed for allowing it to define the position and the orientation of the tool coordinate system Te by inputting a relative displacement amount from a coordinate system T6 set on the virtual joint link J6A and a rotation amount about each axis.

The position/orientation input box group 503 includes boxes for inputting relative displacement amounts in an x-axis, a y-axis, and a z-axis, and boxes for inputting rotation amounts Rx, Ry, and Rz about the x-axis, y-axis, and z-axis, respectively. In the present embodiment, the tool coordinate system Te is defined by the relative displacement from the coordinate system T6 of the virtual joint link J6A, but, alternatively, the tool coordinate system Te may be defined using absolute values in an absolute coordinate system XYZ. Alternatively, the tool coordinate system Te may be set by directly dragging and dropping the tool coordinate system Te.

Furthermore, a confirm button 504 for confirming the input information regarding the position and the orientation, and a cancel button 505 for canceling the input information are provided in the tool coordinate system setting box 501. When the confirm button 504 is clicked after inputting information in the position/orientation input box group 503, the tool coordinate system setting box 501 is closed and the tool coordinate system Te moves according to the information input in the position/orientation input box group 503. When the cancel button 505 is clicked, the tool coordinate system setting box 501 is closed without moving the tool coordinate system Te.

Next, in step 200, a calculation is performed to acquire time-series information on the movement of the robot arm body 100. Here, the time-series information on the movement indicates the displacement amount of each joint link of the robot arm body 100 at each specific time interval. In the present embodiment, the time-series information on the movement of the robot arm body 100 is acquired by performing a simulation by the robot program and the virtual robot arm body 100A.

Figure 8:
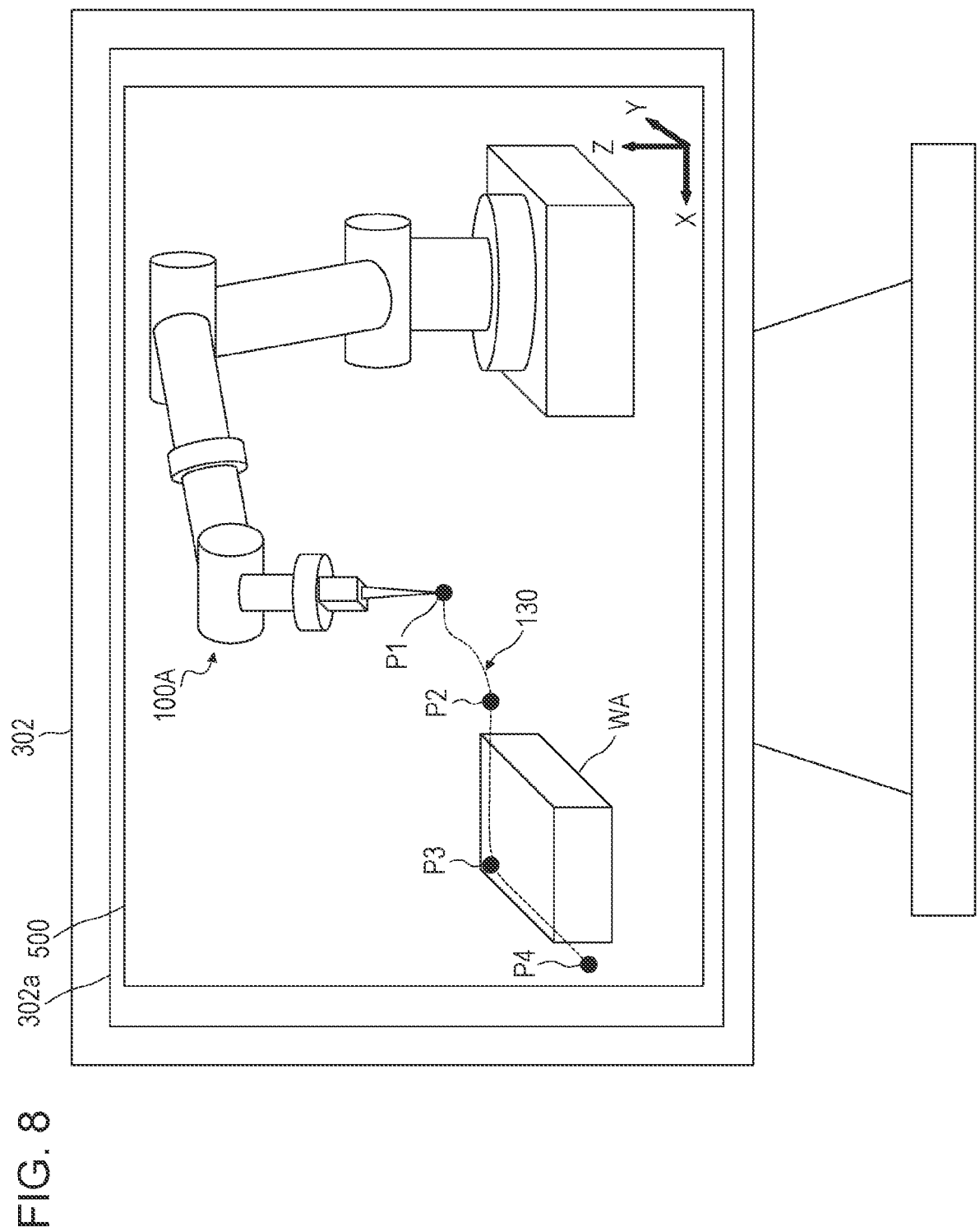
FIG. 8 is a diagram showing training points according to one or more aspects of the present disclosure.

In order to simulate the robot program, first, it is necessary to set training points for training the virtual robot arm body 100A in terms of the coating operation. FIG. 8 shows training points P1 to P4 for the virtual robot arm body 100A to perform the coating operation on the virtual work WA.

The training point P1 is an initial position of the virtual robot arm body 100A, the training point P2 is a standby position where the virtual robot arm body 100A stands by before the coating operation is performed, the training point P3 is a position where the direction of the coating operation is changed, and the training point P4 is an end position of the coating operation. These training points are appropriately set by a user in a similar manner as when the tool coordinate system Te described above is set.

Figure 9:
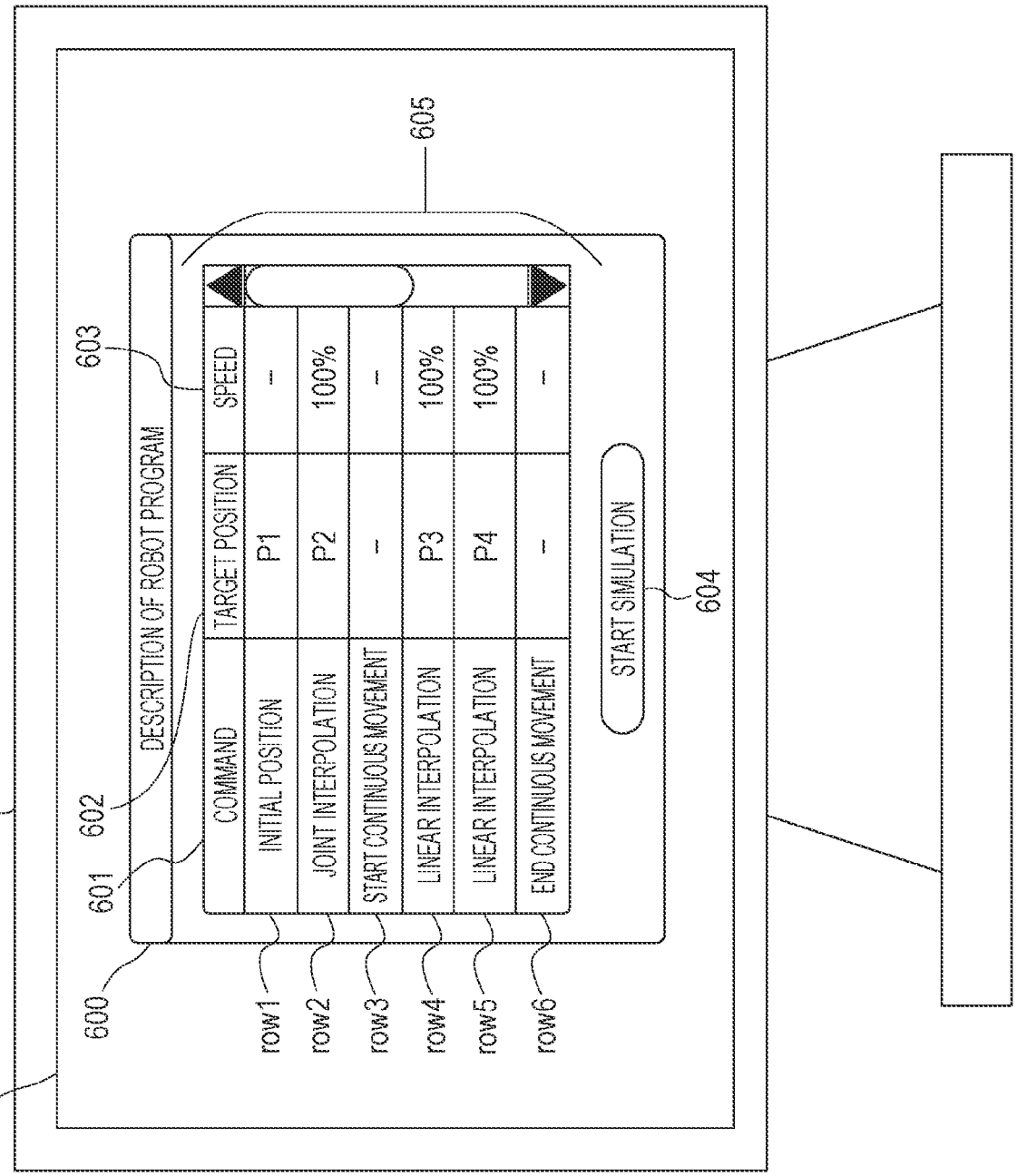
FIG. 9 is a diagram illustrating an example of a description screen according to one or more aspects of the present disclosure.

Next, using the set training points, the user describes the robot program to set how the virtual robot arm body 100.A is to operate. FIG. 9 is a diagram showing a description screen 600 via which the user is allowed to describe the robot program in simple manner. When the CPU 311 is informed via an input unit from the user that the setting of the training points is completed, the CPU 311 displays the description screen 600 in the display area 302a of the display 302 thereby providing a user interface between the user working as an operator and the information processing apparatus 300. In the present embodiment, the virtual space screen 500 is switched to the description screen 600, but, alternatively, the virtual space screen 500 and the description screen 600 may be displayed in the display area 302a at the same time.

In FIG. 9, the description screen 600 has a command column 601 for specifying types of movements, a target position column 602 for specifying training points as movement target points, and a speed column 603 for specifying speeds of the movement of the robot arm body 100.

In a first row (row1) of the table, the training point P1 is described as a position specifying the start position of the simulation, in a second row (row2) of the table, a joint interpolation movement of each joint link of the virtual robot arm body 100A is specified to move from the training point P1, which is the start point of the specific point, to the training point P2 indicating the target position. In a third row (row3) and a sixth row (row6) of the table, it is specified that the movements of the virtual robot arm body 100A specified in rows from the third row (row3) to the sixth row (row6) are to be performed continuously without being stopped, in a 4th row (row4) and a 5th row (row5) of the table, the tool coordinate system Te of the virtual robot arm body 100 is specified to move straight from the training point P2 to the training point P3 and from the training point P3 to the training point P4. These rows are scrolled up/down when a scroll bar 605 is operated, which makes it possible to confirm and describe all rows.

By clicking the simulation start button 604, the user can start the simulation of the virtual robot arm body 100 according to the operation described in the table. A trajectory 130 shown in FIG. 8 indicates a movement of the tool coordinate system Te of the virtual robot arm body 100 according to a result of the simulation.

Figure 10:
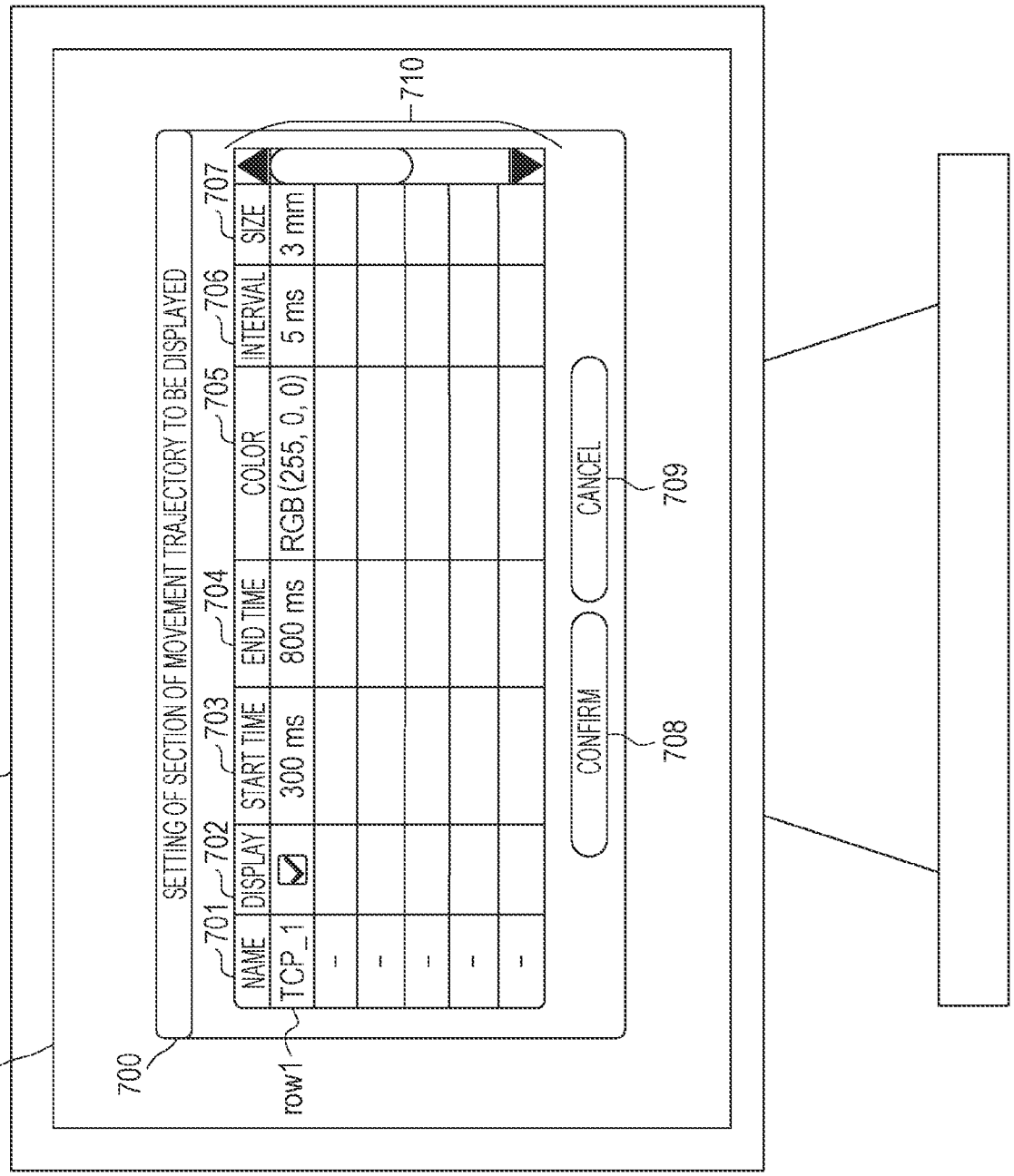
FIG. 10 is a diagram illustrating an example of a display setting screen according to one or more aspects of the present disclosure.

Next, in step S300, the user sets a section of the movement trajectory to be displayed. FIG. 10 is a diagram showing a display setting screen 700 for setting the section of the movement trajectory to be displayed. When the CPU 311 is informed, via an input unit from the user, that the setting of the movement is completed, the CPU 311 displays the display setting screen 700 in the display area 302a of the display 302 thereby providing a user interface between the user who is the operator and the information processing apparatus 300. In the present embodiment, the description screen 600 is switched to the display setting screen 700, but alternatively the description screen 600 and the display setting screen 700 may be displayed in the display area 302a at the same time. Still alternatively, the virtual space screen 500, the description screen 600, and the display setting screen 700 may be displayed in the display area 302a at the same time.

In FIG. 10, the display setting screen 700 includes a table for changing the setting of displaying the movement trajectory for each tool coordinate system. In the present embodiment, only one tool coordinate system is set, and thus TCP_1 indicating the name of the tool coordinate system Te defined in the tool coordinate system setting box 501 is displayed in the first row (row1) of the table. In a case where there are two or more tool coordinate systems, information related to the respective tool coordinate systems are displayed in a plurality of rows (row1 row2, row3, . . . ) such that it is allowed to change the setting of displaying the movement trajectory for each tool coordinate system.

The display setting screen 700 has a name column 701 for displaying the name of the tool coordinate system Te, a check box column 702 specifying whether or not to display the movement trajectory, a start time designation column 703, and an end time designation column 704. Note that a section of a movement trajectory to be displayed is specified by time values described in the start time designation column 703 and the end time designation column 704. The display setting screen 700 further has a color designation column 705 for designating a color of a movement trajectory, an interval designation column 706 for designating a display interval (a time interval) of displaying a movement trajectory, and a size designation column 707 for designating the size of a movement trajectory. When a confirm button 708 is pressed, the movement trajectory is calculated in step S400 as described below, and the calculated movement trajectory is displayed on the virtual space screen 500 according to display conditions set on the display setting screen 700.

Next, in step S400, the movement trajectory is calculated according to the information obtained from step S100 to step S300. More specifically, the movement trajectory is obtained by performing forward kinematics calculation based on the time-series movement information obtained in step S200, that is, based on displacement amounts of the respective joint links of the virtual robot arm body 100A thereby acquiring the position of the tool coordinate system Te indicating the specific point. This calculation is performed at each set display interval from the start time at which the displaying of the movement trajectory is started to the end time set in step S300.

In the example shown in FIG. 10, 300 ms is specified as the start time in the start time designation column 703, 800 ms is specified as the end time in the end time designation column 704, and 5 ms is specified as the interval in the interval designation column 706, and thus, in this case, the positions of the tool coordinate system Te corresponding to times of 300 ms, 305 ms, 310 ms, . . . , 795 ms, and 800 ms are calculated. That is, in the interval designation column 706, the interval of displaying the trajectory is specified in units of time.

Figure 11:
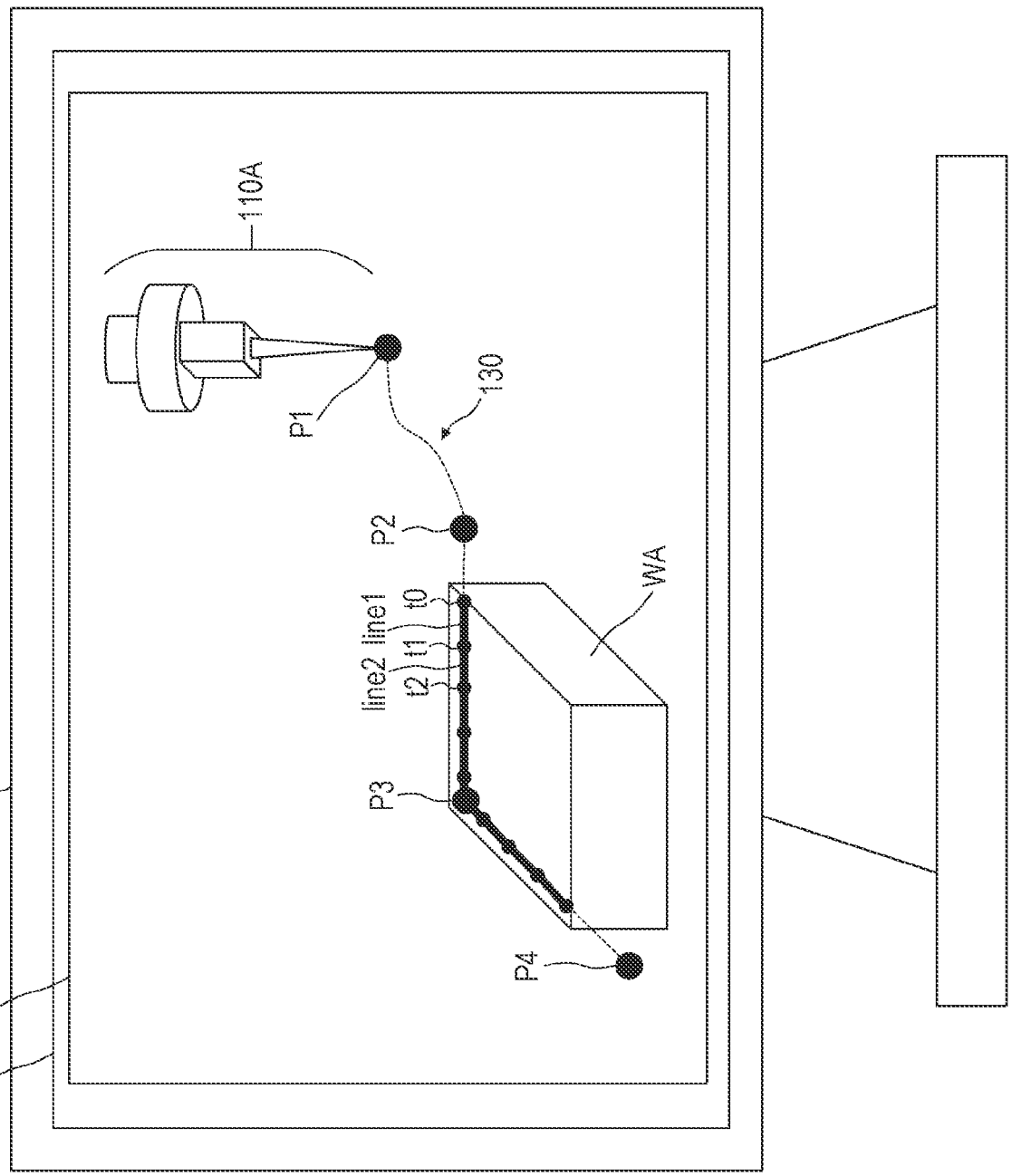
FIG. 11 is a diagram showing an example of a movement trajectory displayed based on display setting made on a display setting screen according to one or more aspects of the present disclosure.

Finally, in step S500, the calculated positions of the movement trajectory are displayed on the screen. FIG. 11 is a diagram illustrating the movement trajectory displayed according to the display setting made on the display setting screen 700. In the example shown in FIG. 11, for convenience of explanation, the tool 110 and the work WA are displayed in an enlarged manner in the virtual space screen 500. A movement trajectory position t0 indicates a position at the start time where displaying the movement trajectory is started. This position t0 is the same as the position of the tool coordinate system Te obtained by the forward kinematics calculation at time of 300 ms in the time-series movement. Following movement trajectory positions t1, t2, . . . , are sequentially displayed at times of 305 ms, 310 ms, and so on.

It is desirable to display each movement trajectory position, for example, by a 3D-model sphere. The radius thereof may be set in step S300 by describing a value in the size designation column 707. In the present embodiment, the size is specified to 3 mm on the virtual space screen 500 in the enlarged state as shown in FIG. 11. The color of the movement trajectory in the section specified by the start time and the end time is set in the color designation column 705 in the color specifying step S300. In the present embodiment, red is specified as the color, Lines that interpolate between the movement trajectory positions (between models) are also displayed. For example, a line segment line1 is displayed so as to interpolate between the movement trajectory positions t0 and t1. In the present embodiment, the width of each displayed line segment is set to a default value of 1.5 mm. The value of the width of the line segment may be set on the display setting screen 700. Thus, the process of displaying the movement trajectory is completed.

Via the series of steps described above, the movement trajectory in the section in which the coating operation is performed on the virtual work WA by the virtual robot arm body 100.A is displayed in a highlighted manner as shown in FIG. 11.

As described above, according to the present embodiment, the user is allowed to display the movement trajectory of the robot only for the movement the user wants to see. Therefore, the user can more easily grasp the robot movement that the user wants to see, and thus it is possible to more efficiently modify or improve the training points of the robot and/or the robot program. In addition, the 3D-model spheres indicating the movement trajectory positions are displayed at specific time intervals, and thus it is possible to visually grasp the movement speed of the robot. For example, it can be seen that the movement speed is high in a large interval between adjacent movement trajectory positions t0, t1 and the movement speed is low in a small interval between adjacent movement trajectory positions. This makes it possible for the user to more efficiently improve the robot program.

Furthermore, by specifying whether or not to display the movement trajectory using the check box in the check box column 702 on the display setting screen 700, it is possible to easily set whether or not displaying is performed for each specific movement trajectory, and thus the user can modify the robot program in a more efficient manner.

In the present embodiment, for convenience of explanation, trajectories and training points which are not specified to be displayed are represented by broken lines, but, to improve visibility, the trajectories and the training points which are not specified to be displayed may be hidden.

Second Embodiment

In the first embodiment described above, the trajectory specified to be displayed is displayed based on specified time intervals. In a second embodiment described below, a trajectory is displayed based on an operation content.

In the following description, explanations are focused on parts of the hardware and the control system different from those according to the first embodiment. Similar parts and operations to those described in the first embodiment can be configured in a similar manner so as to have similar functions, and a further detailed description thereof will be omitted.

Figure 12:
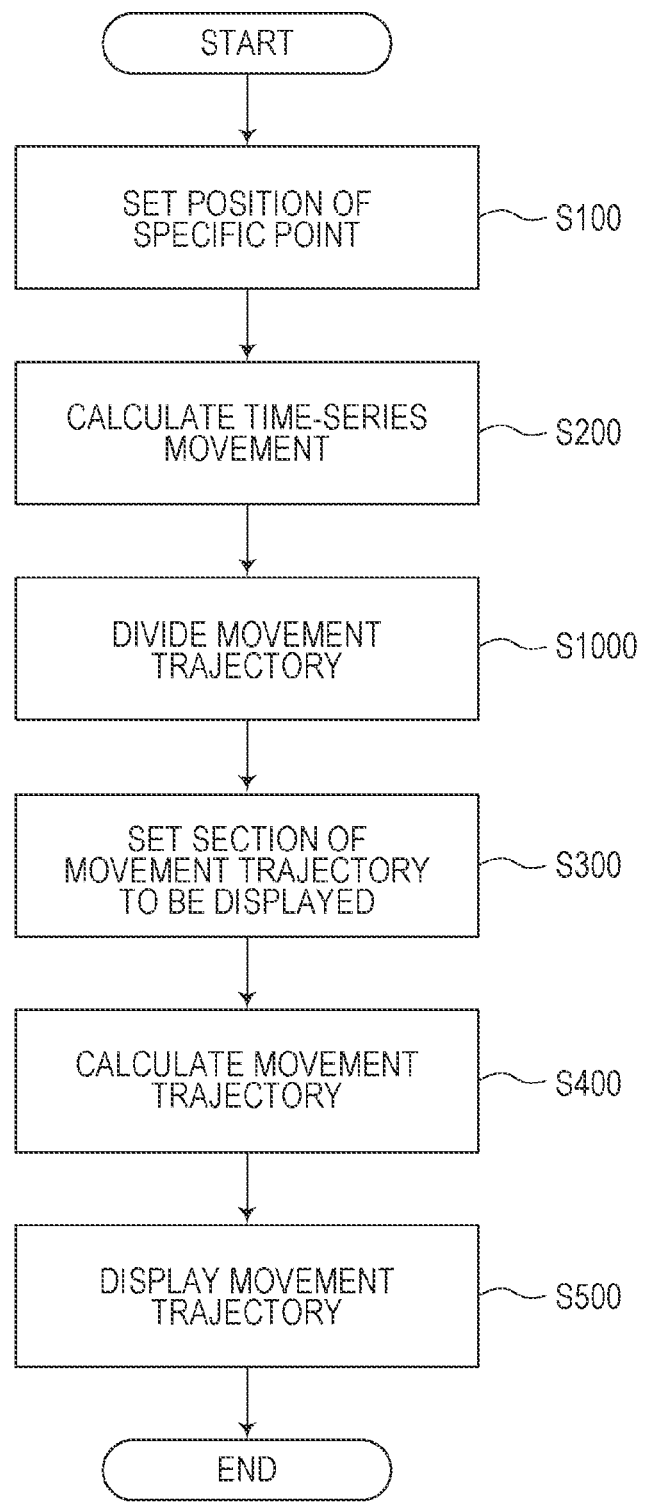
FIG. 12 is a flowchart according to one or more aspects of the present disclosure.

FIG. 12 is a flowchart related to an information processing method according to the present embodiment. A major difference from the first embodiment described above is in that the second embodiment includes an additional process in step S1000 for dividing the trajectory of the tool coordinate system Te depending on set operation contents based on the time-series information on the operation of the virtual robot arm body 100A, as will be described in detail below.

Figure 13:
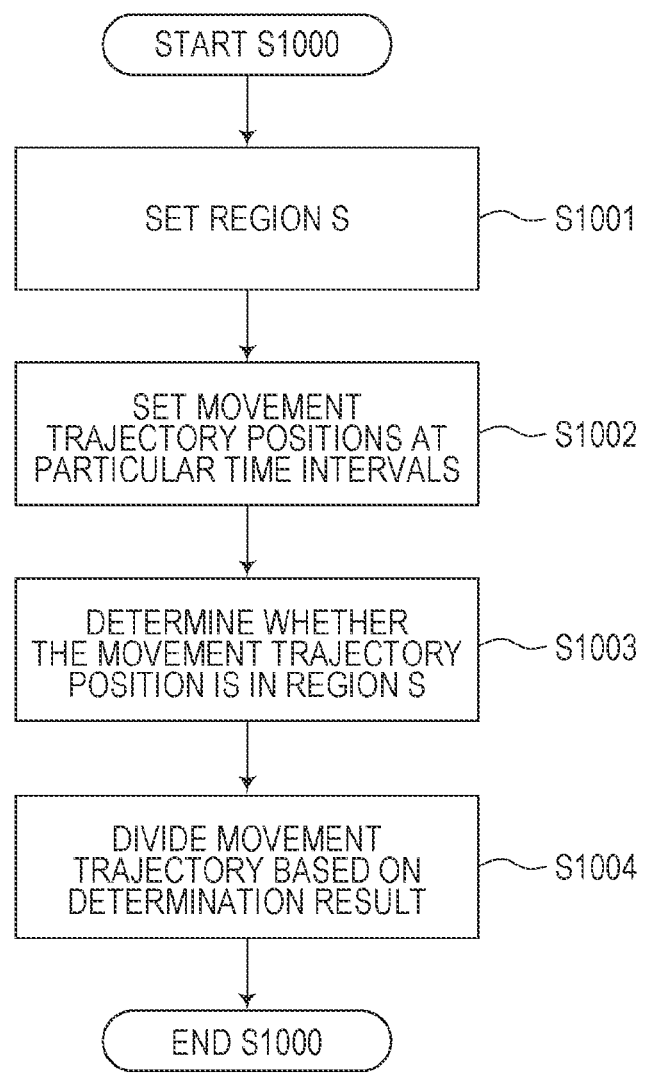
FIG. 13 is a flowchart according to one or more aspects of the present disclosure.
Figure 14:
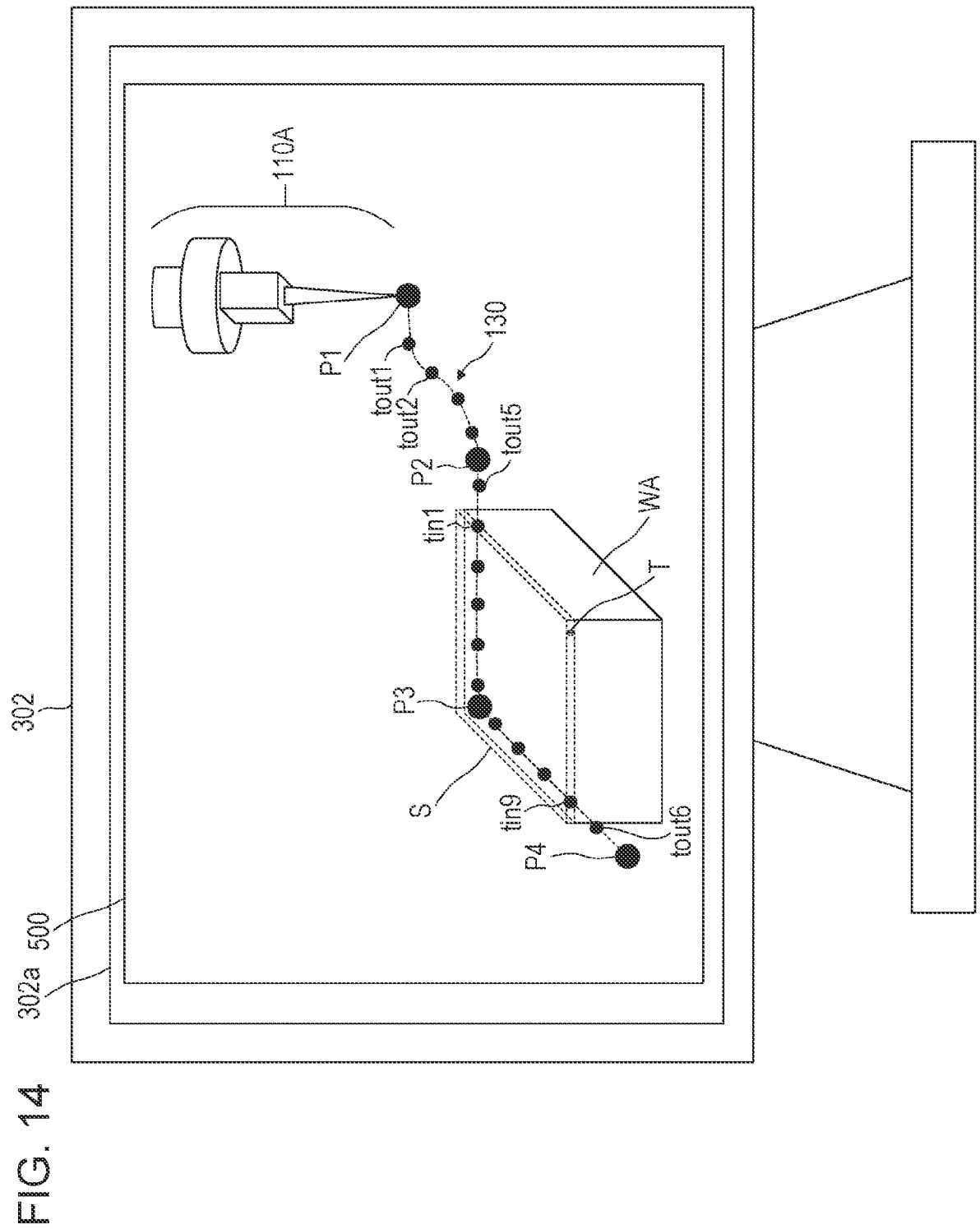
FIG. 14 is a diagram illustrating an example of a virtual space screen according to one or more aspects of the present disclosure.

FIG. 13 is a flowchart showing details of the process in step S1000, FIG. 14 is a diagram illustrating a simulation of a process of dividing a trajectory of the tool Te according to operation contents. In FIG. 14, a trajectory 130 indicates a movement of the tool coordinate system Te of the virtual robot arm body 100A according to a result of the simulation.

Referring to FIGS. 13 and 14, first, in step S1001, the CPU 311 virtually establishes a 3D-model region S so as to cover a surface of the virtual work WA. More specifically, the region S is established so as to have a height T that reaches the space where the tip (the tool coordinate system Te) of the virtual tool 110A moves. Note that the height T may be set arbitrary as long as it reaches the space where the tip (the tool coordinate system Te) of the virtual tool 110A moves.

Next, in step S1002, the movement trajectory positions of the tool coordinate system Te are set on the trajectory 130 at predetermined time intervals. In this specific example, the time interval is set to 5 ins. The movement trajectory positions are each set by a 3D model as in the first embodiment.

Next, in step S1003, it is determined whether or not each movement trajectory position is within the region S.

More specifically, it is determined, using a known interference determination technique, whether there is an interference between the 3D model of the region S and the 3D model of each movement trajectory position, and any movement trajectory position determined to have an interference is regarded as being within the region S and the other movement trajectory positions are regarded as being outside the region S.

In FIG. 14, a movement trajectory position next to the initial position P1 does not interfere with the region S, and thus it is determined that this position is located outside the region S, and this position is denoted as tota1. Similarly, further four movement trajectory positions including the training point P2 are determined to be located outside the region S. and are denoted as tout2, tout3, . . . , and tout5, A movement trajectory position next to the movement trajectory position tout5 interferes with the region S, and thus it is determined that this position is located within the region S, and this position is denoted as tint. Similarly, further eight movement trajectory positions including the training point P3 are determined to be located within the region S, and are denoted as tint, tin3, . . . , and tin9. A movement trajectory position next to the movement trajectory position tin9 does not interfere with the region S, and thus it is determined that this position is located outside the region S, and this position is denoted as tout6. Similarly, further following movement trajectory positions including the training point P4 are determined to be outside the region S.

Next, in S1004, the trajectory 130 is divided according to the operation content taking into account a movement trajectory position where a transition occurs between the outside of the region S and the inside of the region S. In FIG. 14, when the movement trajectory position moves from tout5 to tin1, the movement trajectory position transitions from the outside of the region S to the inside of the region S. When the movement trajectory position moves from tin9 to tout6, the movement trajectory position transitions from the inside of the region S to the outside of the region S.

When the movement trajectory position is in a range from the initial position to the position where the movement trajectory position transitions from the outside of the region S to the inside of the region S, it can be regarded that the movement trajectory position is approaching the virtual work WA to start some operation. Therefore, the approach operation is defined as an operation performed along the trajectory 130 in the outside of the region S until the movement trajectory position enters the region S. Therefore, the range of the trajectory 130 from the training point P1 to the movement trajectory position tint is set as a trajectory in the approach operation.

When the movement trajectory position is in range from the position where the movement trajectory position first enters the region S to the position where the movement trajectory position exits the region S to the outside of the region S, it can be regarded that an operation on the virtual work WA is being performed, Therefore, the range of the trajectory 130 from the position where the movement trajectory position enters the region S to the position where the movement trajectory position exits the region S is set as a trajectory in the coating operation. To avoid overlapping of the movement trajectory between the inside of the region S and the outside of the region S, the range of the trajectory 130 in the coating operation is defined within the region S, that is, within the range from the movement trajectory positions tint to tin9.

Figure 15:
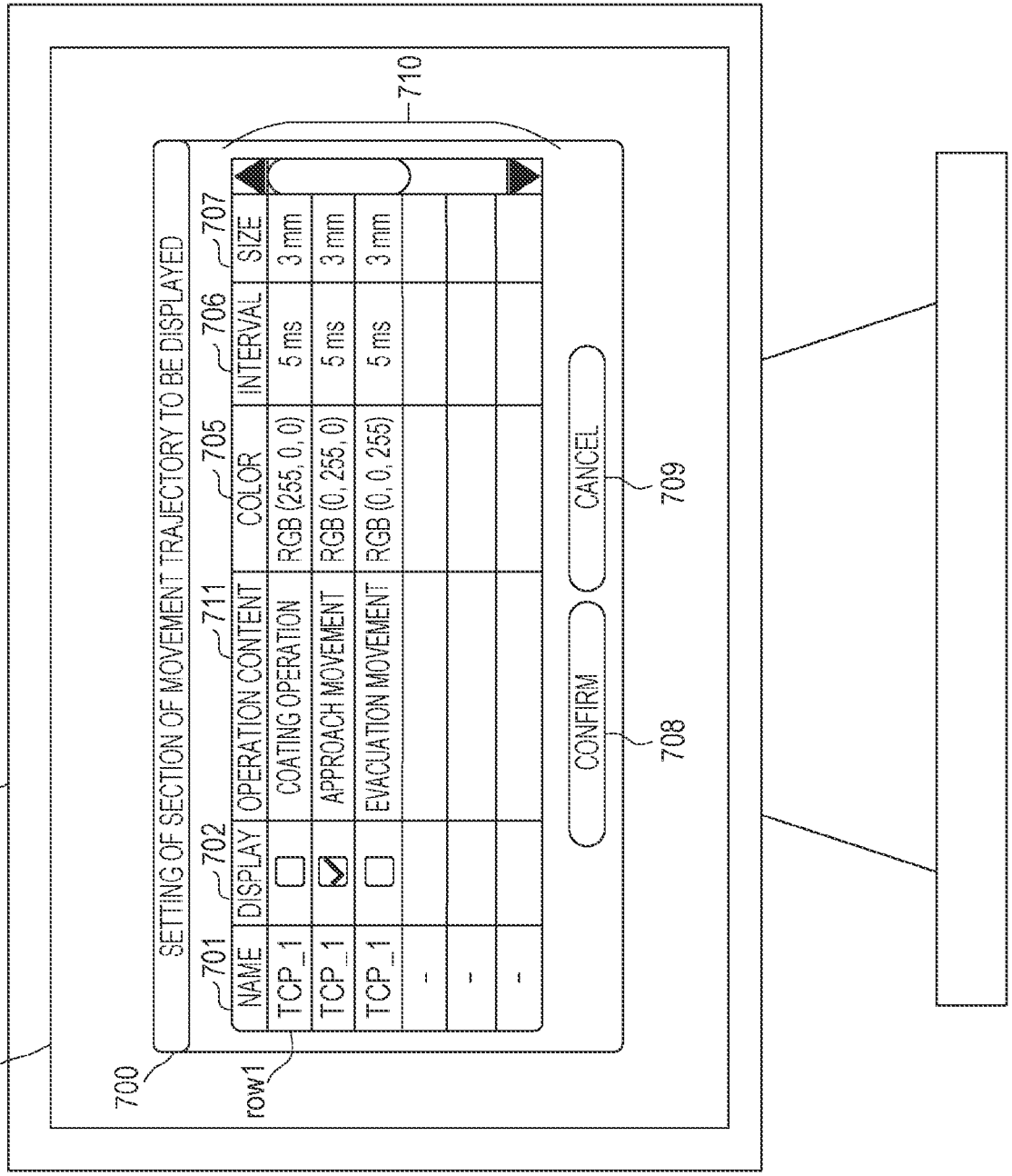
FIG. 15 is a diagram illustrating an example of a display setting screen according to one or more aspects of the present disclosure.

The range of the trajectory 130 from the movement trajectory position tin9 to the training point P4 where the movement ends is defined as a range in a retraction operation. As described above, the trajectory 130 can be automatically divided according to the content of the operation. When the dividing of the trajectory 130 is completed, the process proceeds to step S300, FIG. 15 is a diagram showing the display setting screen 700 for setting a display section in which the movement trajectory is displayed according to the present embodiment. The difference from the first embodiment is that the display setting screen 700 further includes an operation content display column 711 for displaying an operation content. In step S300, the user sets a manner of displaying the movement trajectory in each of the movement trajectory ranges obtained in S1000 as a result of dividing the movement trajectory depending on the operation contents. In the example shown in FIG. 15, a check box corresponding to the approach operation in the check box column 702 is checked thereby specifying that the movement trajectory in the approach operation is to be displayed. Furthermore, in the size designation column 707, the radius of the sphere indicating the movement trajectory position is set to 3 mm. Furthermore, in the color designation column 705, the color of the movement trajectory in the approach operation is set to green. Furthermore, the display time interval is set to 5 ms in the interval designation column 706.

Figure 16:
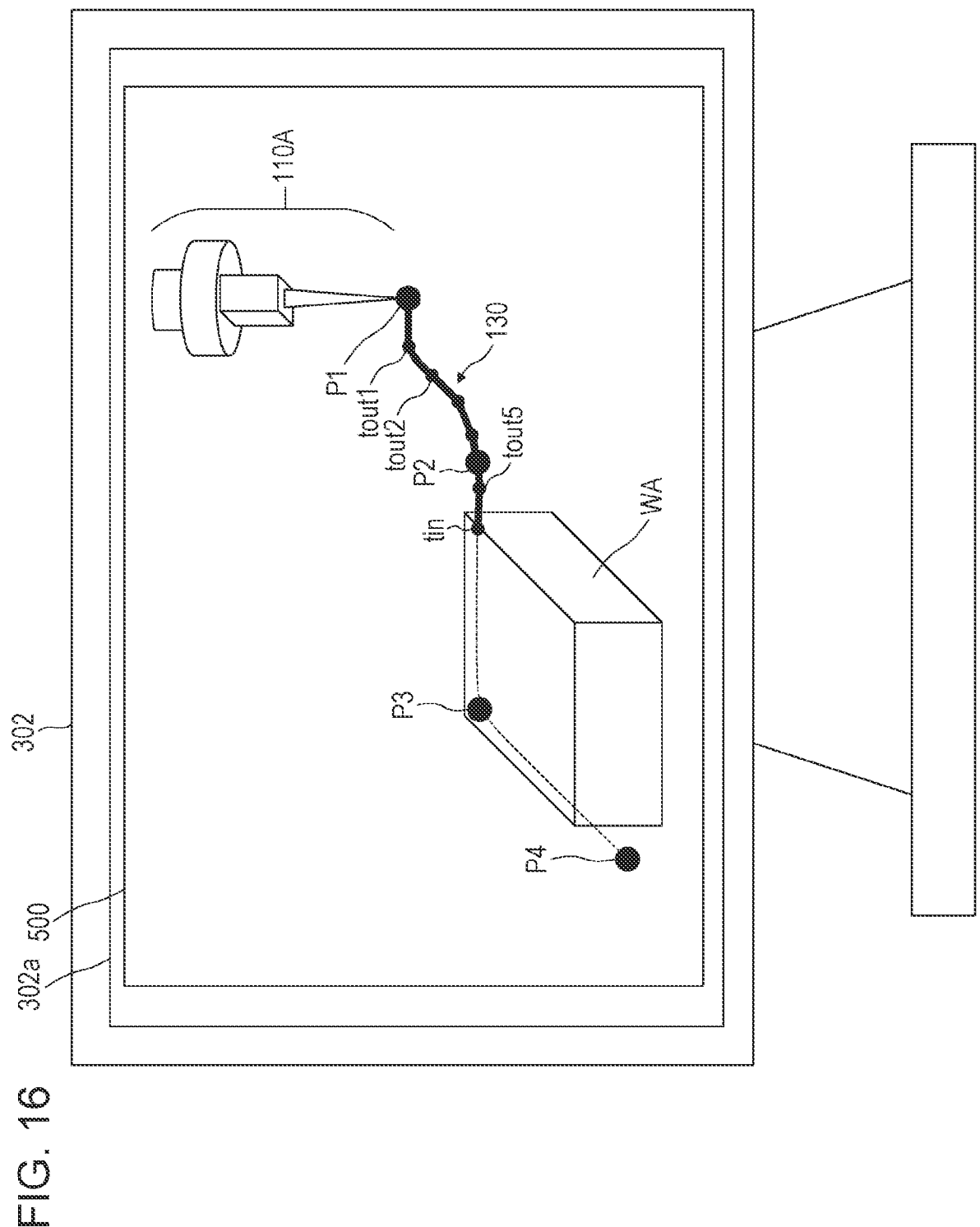
FIG. 16 is a diagram showing an example of a movement trajectory displayed based on display setting made on a display setting screen according to one or more aspects of the present disclosure.

Next, in step S400, the movement trajectory to be displayed is calculated according to the information obtained from step S100 to step S300, and, in step S500, the positions of the calculated movement trajectory are displayed on the screen. FIG. 16 is a diagram showing the movement trajectory displayed according to the display setting performed on the display setting screen 700 according to the present embodiment. In the example shown in FIG. 16, for convenience of explanation, the virtual tool 110A and the virtual work WA are displayed in an enlarged manner in the virtual space screen 500. According to the designation made on the display setting screen 700, the movement trajectory positions are sequentially displayed at intervals of 5 ms on the trajectory 130 in the approach operation from the training point P1 to the movement trajectory position tint such that each movement trajectory position is displayed by a green sphere with a radius of 3 mm. Lines that interpolate between the movement trajectory positions are also displayed in green.

In the present embodiment, for convenience of explanation, the time interval in the process in step S1000 and the display time interval are equally set to 5 ms, but the display time interval may be set arbitrarily. In this case, the movement trajectory positions are displayed at the time intervals set in a time interval column 706 along a divided movement trajectory from an initial position to an end position.

As described above, according to the present embodiment, the user is allowed to display the movement trajectory of the robot only for the movement the user wants to see. Phis makes it possible for the user to easily grasp the movement of the robot that the user wants to see, and thus it becomes possible to efficiently modify the training points of the robot and the robot program. In addition, since the movement trajectory is automatically divided according to the operation content, it becomes possible to further improve the efficiency of grasping the movement the user wants to see and modifying the training points of the robot and the robot program.

In the present embodiment, for convenience of explanation, trajectories and training points which are not specified to be displayed are represented by broken lines, but, to improve visibility, the trajectories and the training points which are not specified to be displayed may be hidden.

Third Embodiment

In the second embodiment described above, a trajectory to be displayed is automatically set for each operation. Alternatively, a trajectory may be displayed for each control content (control mode) executed by the robot arm body 100. In the following description, explanations are focused on parts of the hardware and the control system different from those according to the first and second embodiments. Similar parts and operations to those described in the first or second embodiment can be configured in a similar manner so as to have similar functions, and a further detailed description thereof will be omitted.

Figure 17:
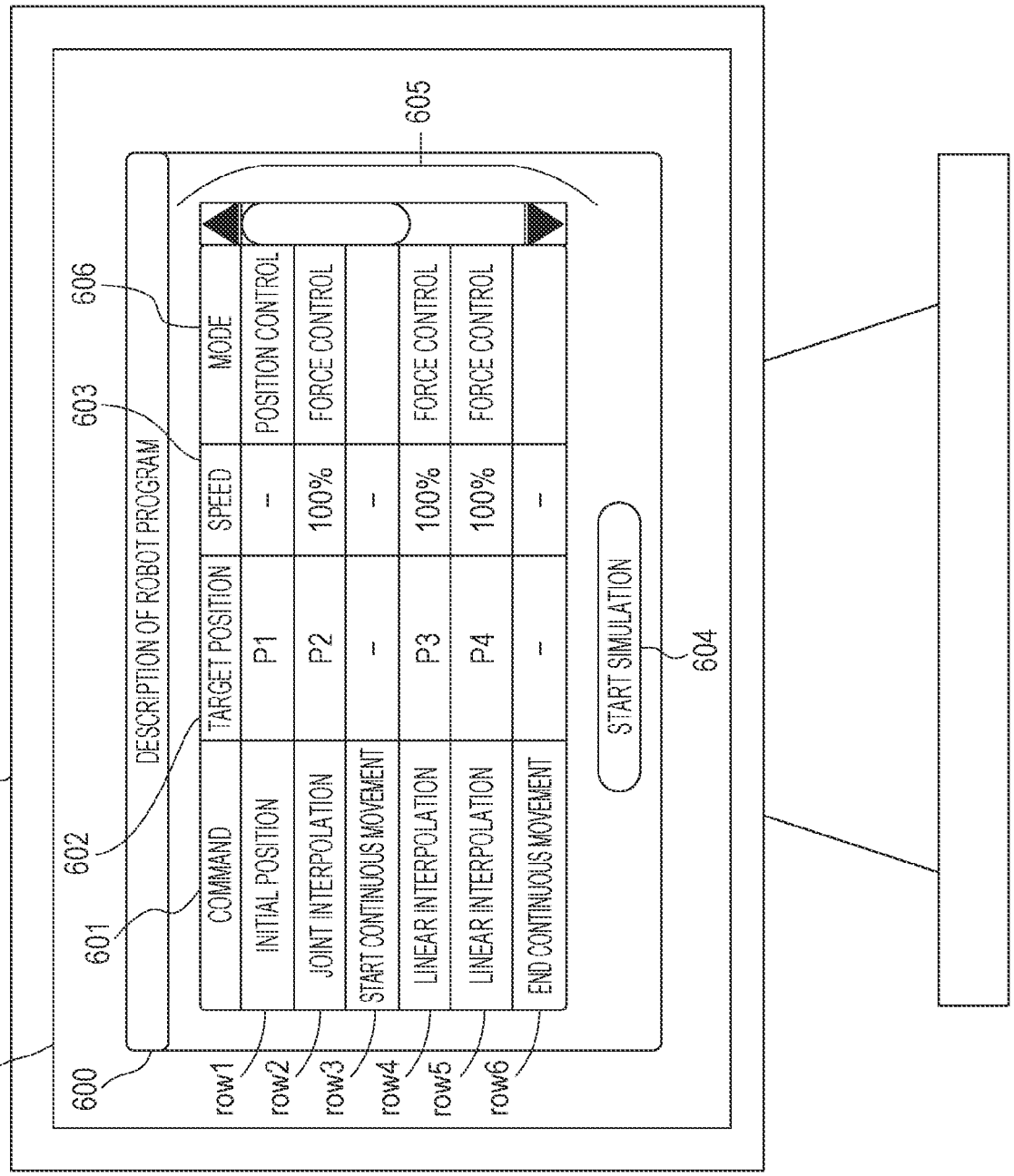
FIG. 17 is a diagram illustrating an example of a description screen according to one or more aspects of the present disclosure.

FIG. 17 is a diagram showing a description screen 600 via which a user is allowed to describe a robot program in a simple manner according to the present embodiment. A major difference from the first embodiment and the second embodiment described above is that the description screen 600 further includes a control mode setting column 606 for setting whether the virtual robot arm body 100A is controlled by position control or force control for each training point. In FIG. 17, it is specified that the position control (the position control mode) is started at the training point P1. Processes are performed in a similar manner as in steps S100 and S200 and the robot program is described such that the control mode is switched at the training point P2 from the position control to the force control (the three control mode) and the force control is executed until the training point P4 is reached.

Figure 18:
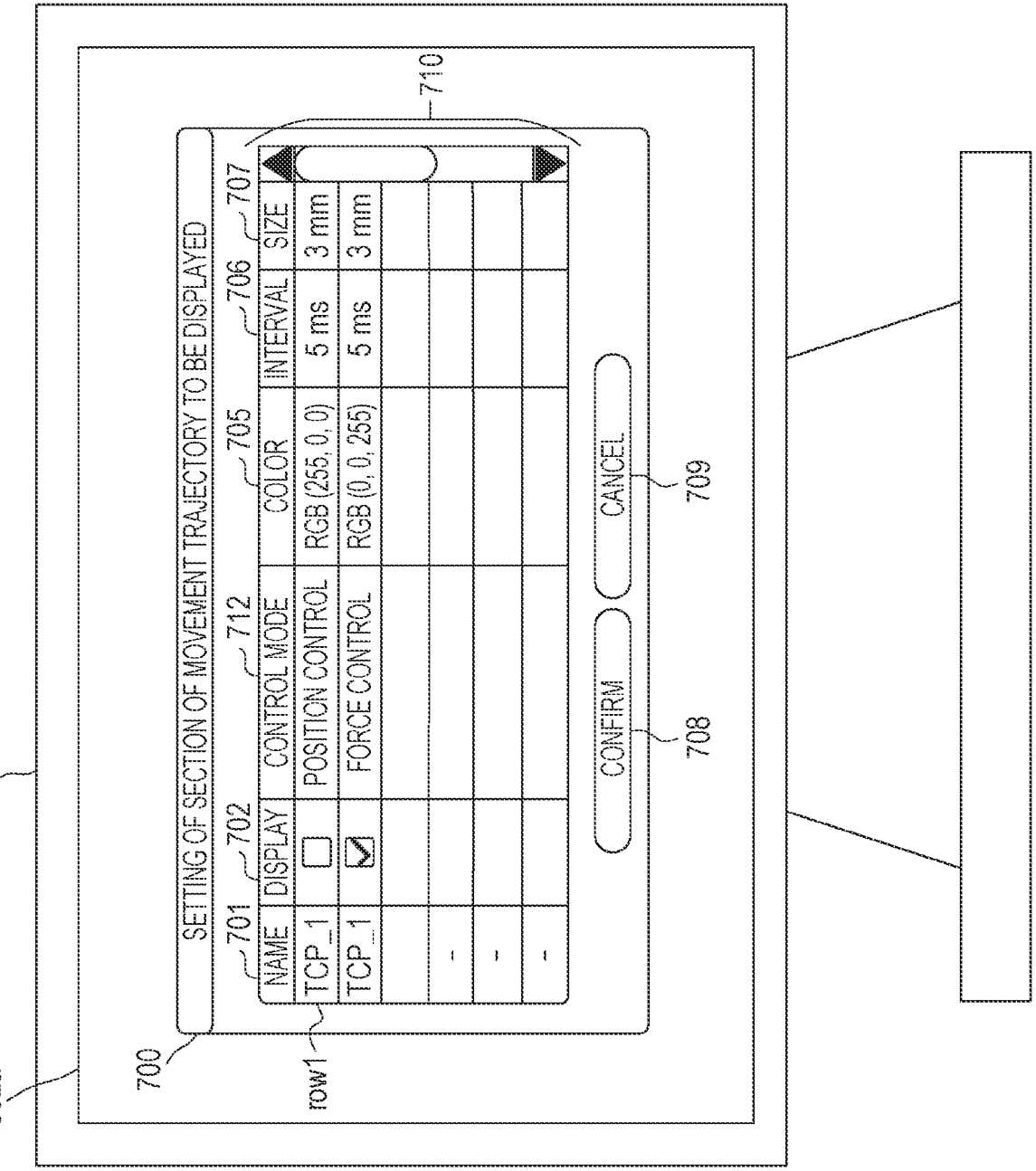
FIG. 18 is a diagram illustrating an example of a display setting screen according to one or more aspects of the present disclosure.

FIG. 18 is a diagram showing a display setting screen 700 for setting a display, section in which the movement trajectory is to be displayed according to the present embodiment. A difference from the first embodiment and the second embodiment is that the display setting screen 700 further includes a control mode display column 712 for displaying the control mode. A process similar to that in step S300 is performed to allow the user to set a manner of displaying the movement trajectory for each control mode based on the robot program. In FIG. 18, a check box in the check box column 702 corresponding to the force control mode is checked thereby specifying that the movement in the force control mode is to be displayed. Furthermore, in the size designation column 707, the radius of the sphere indicating the movement trajectory position is set to 3 mm. Furthermore, in the color designation column 705, it is specified that the movement trajectory in the approach operation is to be displayed in blue. Furthermore, the display time interval is set to 5 ms in the interval designation column 706.

Figure 19:
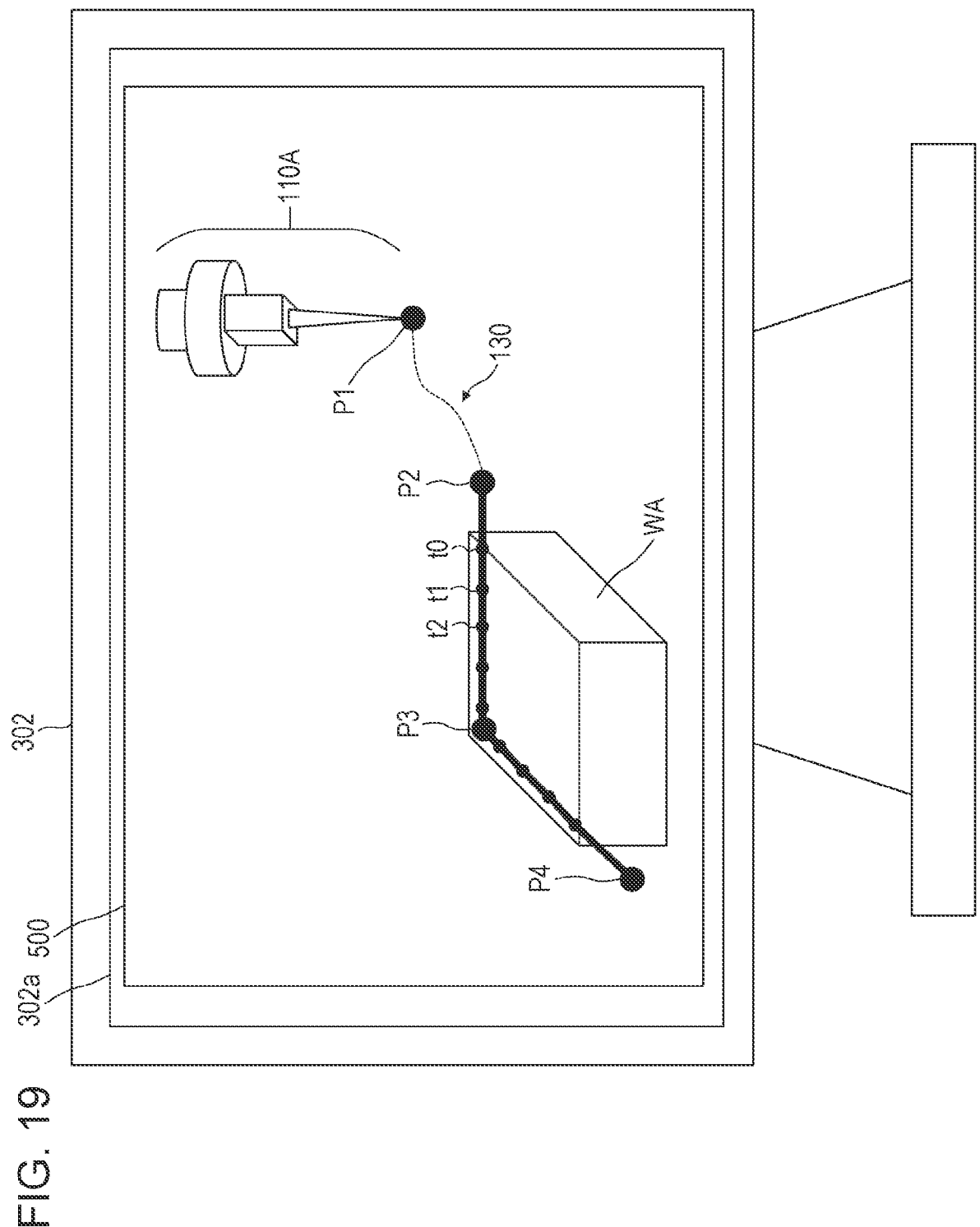
FIG. 19 is a diagram showing an example of a movement trajectory displayed based on display setting made on a display setting screen according to one or more aspects of the present disclosure.

FIG. 19 is a diagram showing the movement trajectory displayed according to the display setting performed on the display setting screen 700 according to the present embodiment. Processes are performed in a similar manner as in steps S400 and S500 to calculate the movement trajectory and perform the display setting on the display setting screen 700, According to the calculation result and the display setting, movement trajectory positions are displayed at intervals of 5 ms on the trajectory 130 of the movement in the force control mode from the training point P2 to the training point P4. The movement trajectory positions are displayed in blue with a radius of 3 mm Lines that interpolate between the movement trajectory positions are also displayed in green.

As described above, according to the present embodiment, the user is allowed to display the movement trajectory of the robot only for the movement the user wants to see. This makes it possible for the user to easily grasp the movement of the robot that the user wants to see, and thus it becomes possible to efficiently modify the training points of the robot and the robot program. Furthermore, it is possible to grasp the control modes applied to the robot arm body 100, that is, it is possible to grasp where on the trajectory the position control is performed and where on the trajectory the force control is performed. Therefore, for example, in a case where an operation is performed in cooperation with other one or more robots, it is possible to properly set the control mode of the other one or more robots according to the control mode of the robot arm body 100.

In the present embodiment, for convenience of explanation, trajectories and training points which are not specified to be displayed are represented by broken lines, but, to improve visibility, the trajectories and the training points which are not specified to be displayed may be hidden.

Fourth Embodiment

In the third embodiment described above, the movement trajectory is displayed for the specified control mode. In a third embodiment described below in a case where a plurality of tools are used, a trajectory is displayed for each of the plurality of tools operated. In the following description, explanations are focused on parts of the hardware and the control system different from those according to the first, second, and third embodiments. Similar parts and operations to those described in the previous embodiments can be configured in a similar manner so as to have similar functions, and a further detailed description thereof will be omitted.

Figure 20:
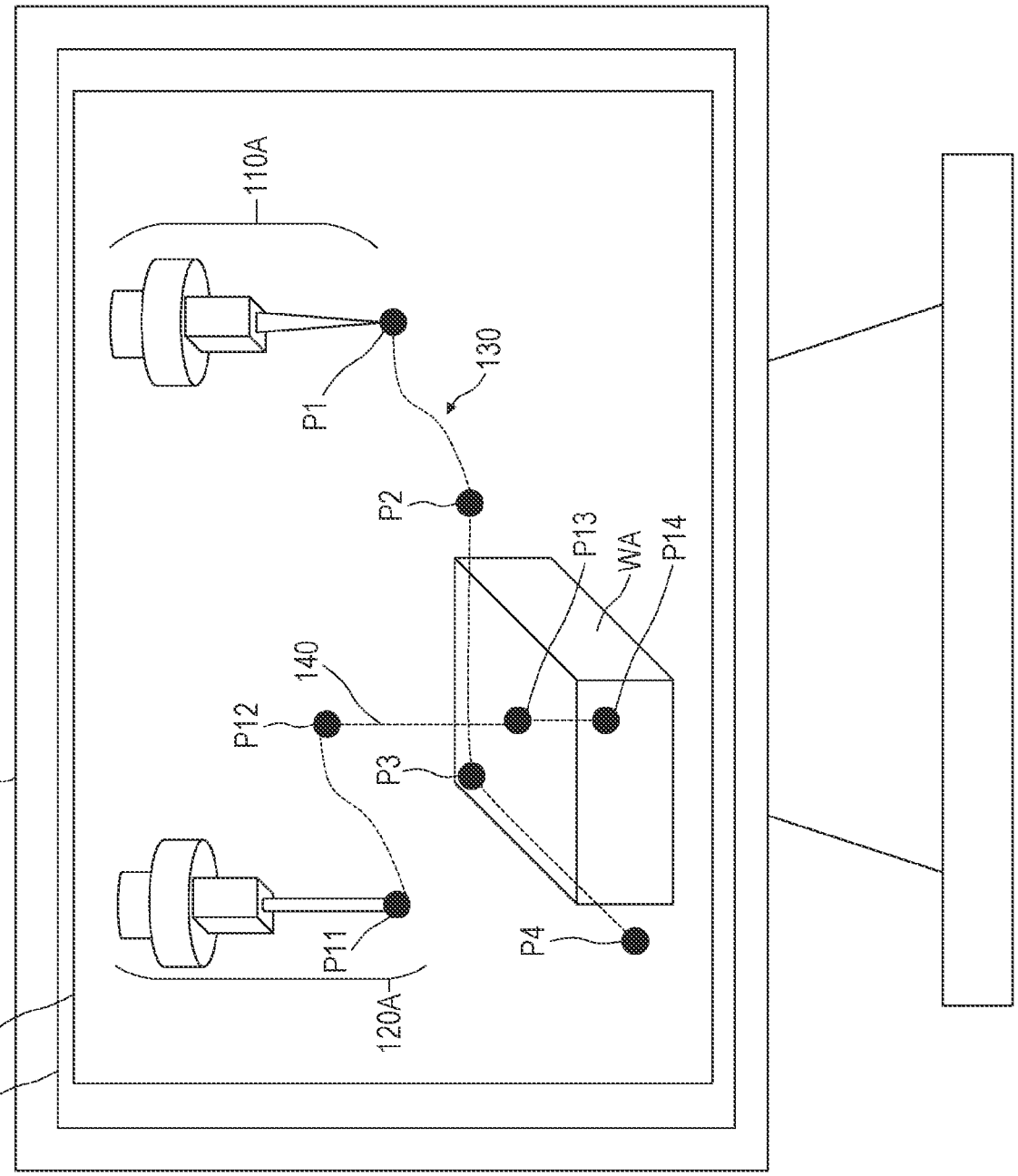
FIG. 20 is a diagram illustrating an example of a virtual space screen according to one or more aspects of the present disclosure.

FIG. 20 is a diagram showing a virtual space screen 500 which is displayed in the display area 302a of the display 302 when the virtual tool 110A and the virtual tool 120A are simulated according to the present embodiment. A major difference from the previous embodiments described above is that setting is made for an operation of the virtual tool 120A provided on a virtual robot arm different from the virtual robot arm body 100A as will be described in detail below.

In FIG. 20, the virtual tool 120A is a tool provided with an end mill. After a coating operation is performed by the virtual tool 110A, a hole is created in a predetermined portion of the virtual work WA by performing a cutting operation using the end mill of the virtual tool 120A. Although not shown in FIG. 20, a tool coordinate system Te is set at the tip of the virtual tool 120A as in the first embodiment. As in the process in step S100, when the virtual tool 120A is clicked with the mouse 304, 3D-model arrows indicating the position and the orientation of the tool coordinate system Te are displayed in the virtual space. When the tool coordinate system Te is clicked with the mouse 304, a tool coordinate system setting box 501 is displayed. In the tool coordinate system setting box 501, a name input box 502 for describing the name of the tool coordinate system is displayed. Furthermore, a position/orientation input box group 503 is displayed for allowing it to define the position and the orientation of the tool coordinate system Te by inputting a relative displacement amount from a coordinate system T6 set on the virtual joint link J6A and a rotation amount about each axis. In the present embodiment, TCP_2 is set as the name of the tool coordinate system of the virtual tool 120A.

Furthermore, in FIG. 20, training points P11 to P14 for performing a cutting operation on the virtual work WA by the virtual tool 120A, and a trajectory 140 are shown. The training point P11 is an initial position of the virtual tool 120A, the training point P12 is a standby position for standing by before performing the cutting operation, the training point P3 is a start position where the cutting operation is started (the end mill starts to rotate), and the training point P4 is an end position where the cutting operation is ended (the end mill ends the rotation), These training points are appropriately set by a user in a similar manner as when the tool coordinate system Te described above is set. A process is performed in a similar manner as in step S200 in the first embodiment to determine how each training point is to be moved (movement interpolation) and describe the robot program on the description screen 600. The setting of the tool coordinate system, the setting of the training points, and the training of the robot program are similar to those according to the first embodiment, and thus a further description thereof is omitted.

Figure 21:
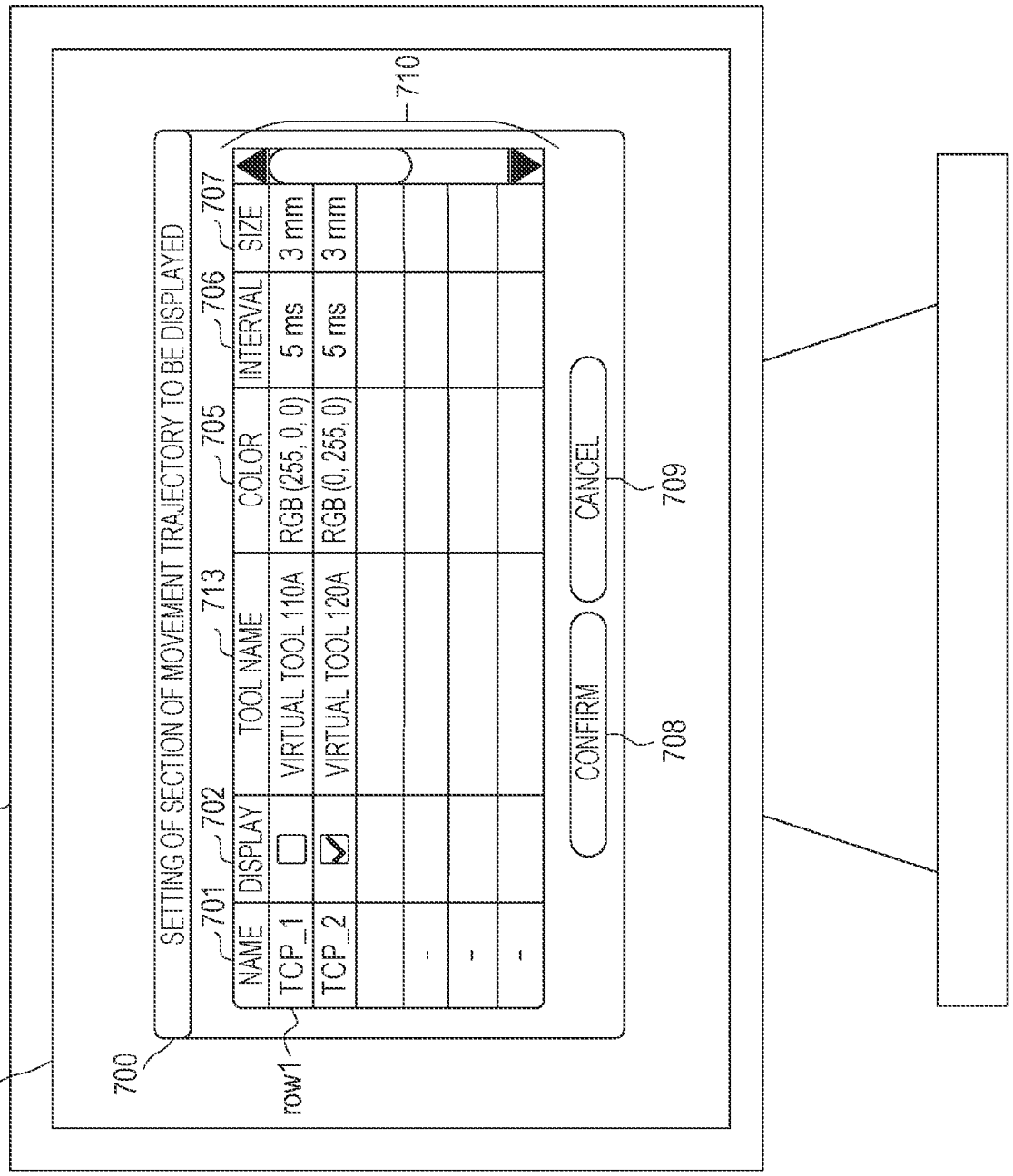
FIG. 21 is a diagram illustrating an example of a display setting screen according to one or more aspects of the present disclosure.

FIG. 21 is a diagram showing a display setting screen 700 for setting a display section in which the movement trajectory is to be displayed according to the present embodiment. This display setting screen 700 according to the present embodiment is different from those according to the first embodiment, the second embodiment, and the third embodiment in that this display setting screen 700 further includes a tool name column 713 for displaying a tool name. The tool name may be the same as the name of the robot on which the tool is disposed. In the present embodiment, a sphere is used as the shape of the model indicating the movement trajectory positions related to the movement of the virtual tool 120A, but, to improve visibility, the movement trajectory positions of the virtual tool 120A may be indicated using a predetermined shape different from that for the virtual tool 110A. For example, the predetermined shape may be a rectangle, a triangle, a rhombus, a star, etc.

A process is performed in a similar manner to the process in step S300 in the previous embodiments to allow the user to set how the movement trajectory is to be displayed for each tool based on the robot program. In FIG. 21, a check box in the check box column 702 corresponding to the virtual tool 120A is checked thereby specifying that the movement of the virtual tool 120A is to be displayed. Furthermore, in the size designation column 707, the radius of the sphere indicating the movement trajectory position is set to 3 mm. Furthermore, in the color designation column 705, the color of the virtual tool 120A is set to green. Furthermore, the display time interval is set to 5 ms in the interval designation column 706.

Figure 22:
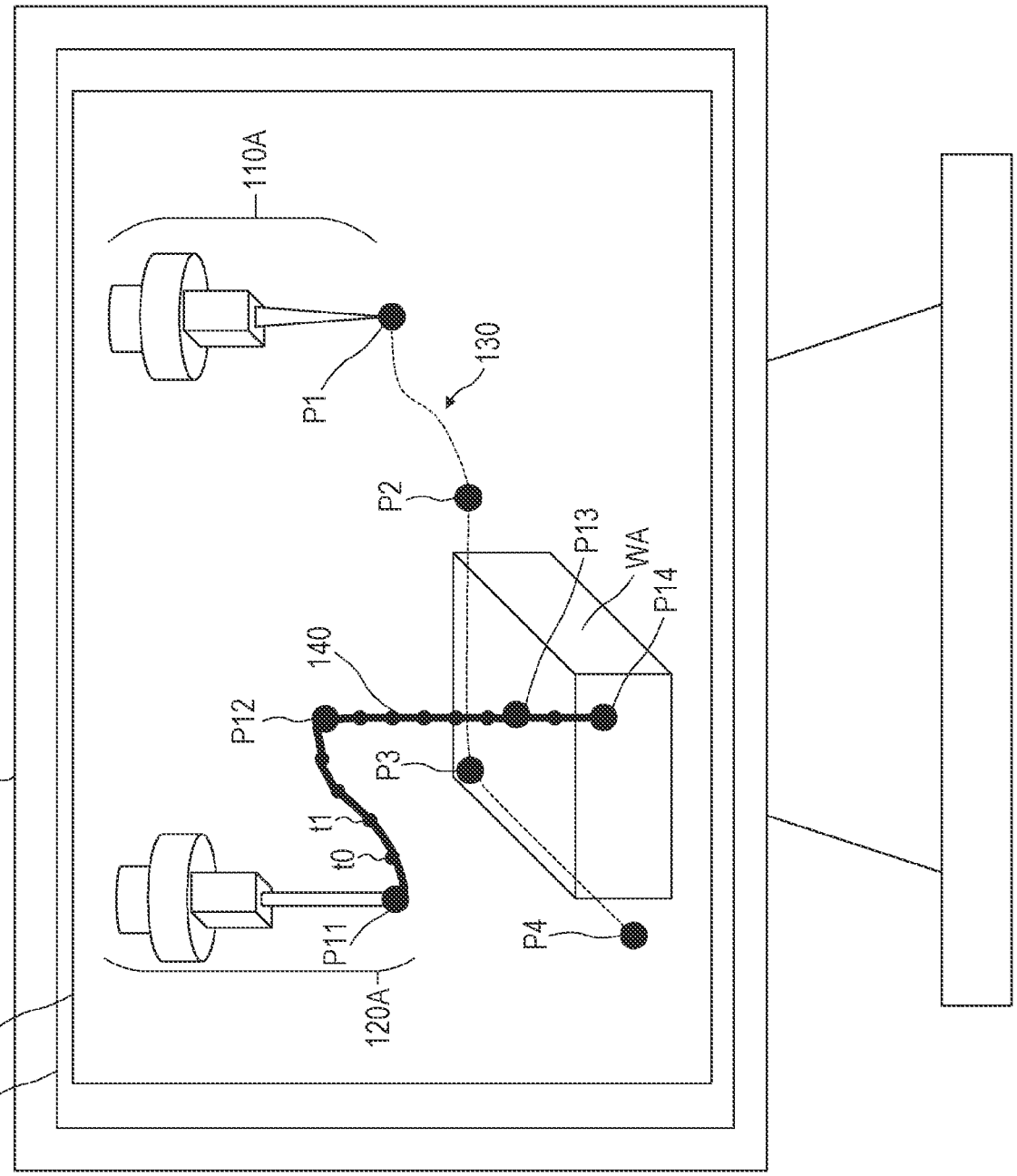
FIG. 22 is a diagram showing an example of a movement trajectory displayed based on display setting made on a display setting screen according to one or more aspects of the present disclosure.

FIG. 22 is a diagram showing the movement trajectory displayed according to the display setting performed on the display setting screen 700 according to the present embodiment. Processes are performed in a similar manner as in steps S400 and S500 to calculate the movement trajectory and perform the display setting on the display setting screen 700, According to the calculation result and the display setting, movement trajectory positions are displayed at intervals of 5 ms on the trajectory 140 of the movement of the virtual tool 120A from the training point P11 to the training point P14. The movement trajectory positions are displayed in green with a radius of 3 mm. Lines that interpolate between the movement trajectory positions are also displayed in green.

As described above, according to the present embodiment, the user is allowed to display the movement trajectory of the robot only for the movement the user wants to see. This makes it possible for the user to easily grasp the movement of the robot that the user wants to see, and thus it becomes possible to efficiently modify the training points of the robot and the robot program. Even in a case where additional robots are installed in a factory and thus the factory becomes complicated, displaying a trajectory of a movement of each tool according to the present embodiment makes it possible to grasp, with great easiness, the movement of the robot or the tool that the user wants to see.

In the present embodiment, for convenience of explanation, trajectories and training points which are not specified to be displayed are represented by broken lines, but, to improve visibility, the trajectories and the training points which are not specified to be displayed may be hidden.

Fifth Embodiment

In the fourth embodiment described above, displaying is performed for the movement trajectory of the tool of a plurality of robots the user wants to see. In a fifth embodiment described below, the movement trajectory is displayed for a part of a robot the user wants to see. In the following description, explanations are focused on parts of the hardware and the control system different from those according to the first, second, third, and fourth embodiments. Similar parts and operations to those described in the previous embodiments can be configured in a similar manner so as to have similar functions, and a further detailed description thereof will be omitted.

Figure 23:
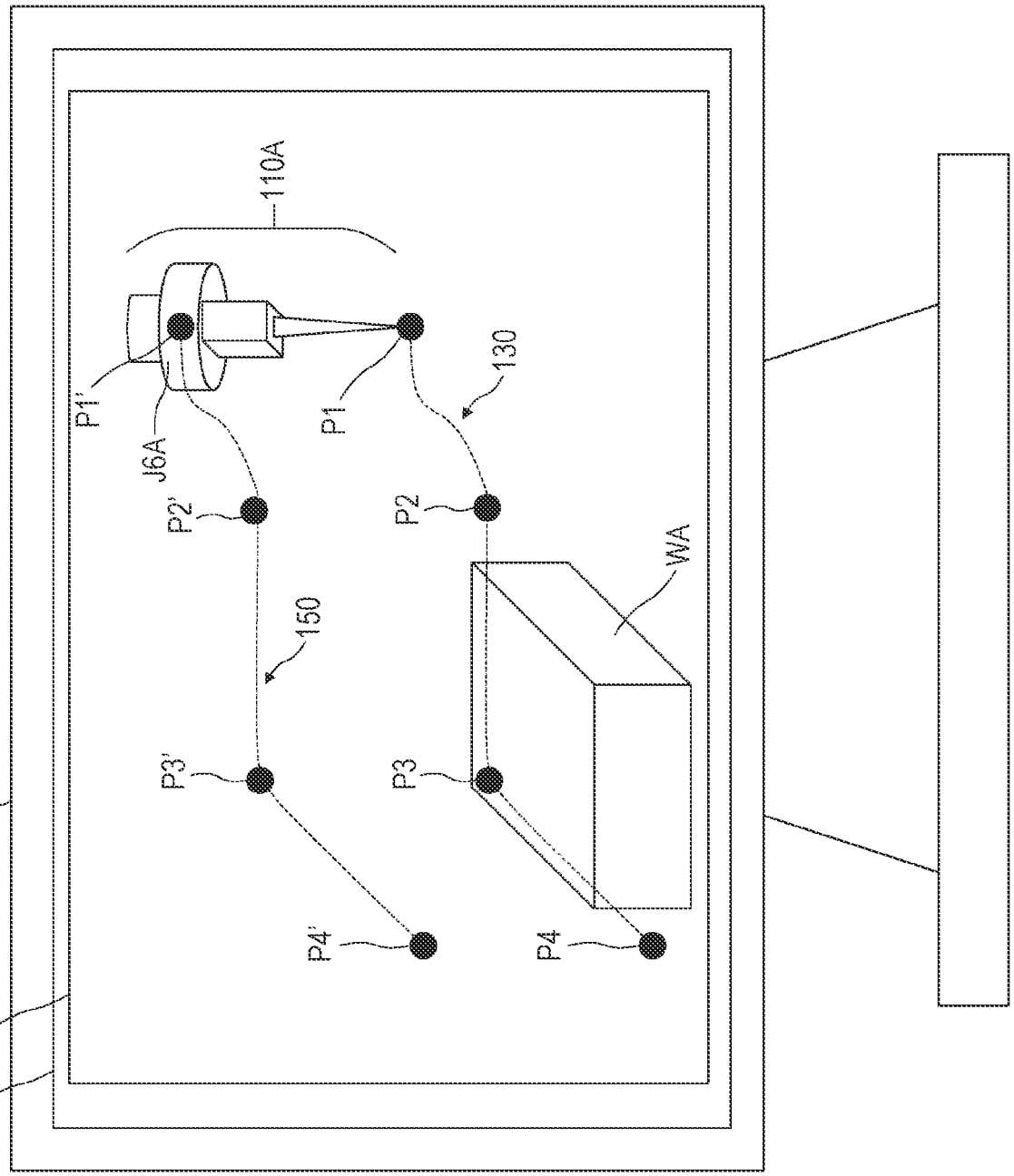
FIG. 23 is a diagram illustrating an example of a virtual space screen according to one or more aspects of the present disclosure.

FIG. 23 is a diagram showing a virtual space screen 500 which is displayed in the display area 302a of the display 302 when the virtual tool 110A and the virtual joint link J6A are simulated according to the present embodiment. A major difference from the various embodiments described above is that the operation of the virtual joint link J6A is set as will be described in detail below.

In FIG. 23, the virtual joint link J6A, moves along a trajectory 150. Although not shown in FIG. 23, a tool coordinate system T6 is set on the virtual joint link J6A as in the first embodiment. As in the process in step S100, when the virtual joint link J6A is clicked with the mouse 304, 3D-model arrows indicating the position and the orientation of the tool coordinate system T6 are displayed in the virtual space. When the coordinate system T6 is clicked with the mouse 304 to perform various settings of the coordinate system T6, the tool coordinate system setting box 501 is displayed. In the tool coordinate system setting box 501, a name input box 502 for describing the name of the tool coordinate system is displayed. Furthermore, a position/orientation input box group 503 is displayed. In this position/orientation input box group 503, it is allowed to define the position and the orientation of the coordinate system T6 by inputting a relative displacement amount from the coordinate system T5 set on the virtual joint link J5A and a rotation amount about each axis. In the present embodiment, TCP_3 is set as the name of the coordinate system T6 of the virtual joint link J6A, FIG. 23 shows the trajectory 150 and the training points P1' to P4' on the trajectory 150 along which the virtual joint link J6A moves. In this example, the trajectory 150 of the tool coordinate system T6 is similar to the trajectory 130 of the tool coordinate system Te, and thus the trajectory 150 is displayed simply by shifting the trajectory 130. Note that setting of these training points may be performed as necessary by the user in a similar manner as when setting of the tool coordinate system Te described above is performed. Further, as in the first embodiment, setting as to how each training point is to be moved (movement interpolation) may be performed in a similar manner as in step S200, and may be described in a robot program on the description screen 600. The setting of the tool coordinate system, the setting of the training points, and the training of the robot program are similar to those according to the first embodiment, and thus a further description thereof is omitted.

Figure 24:
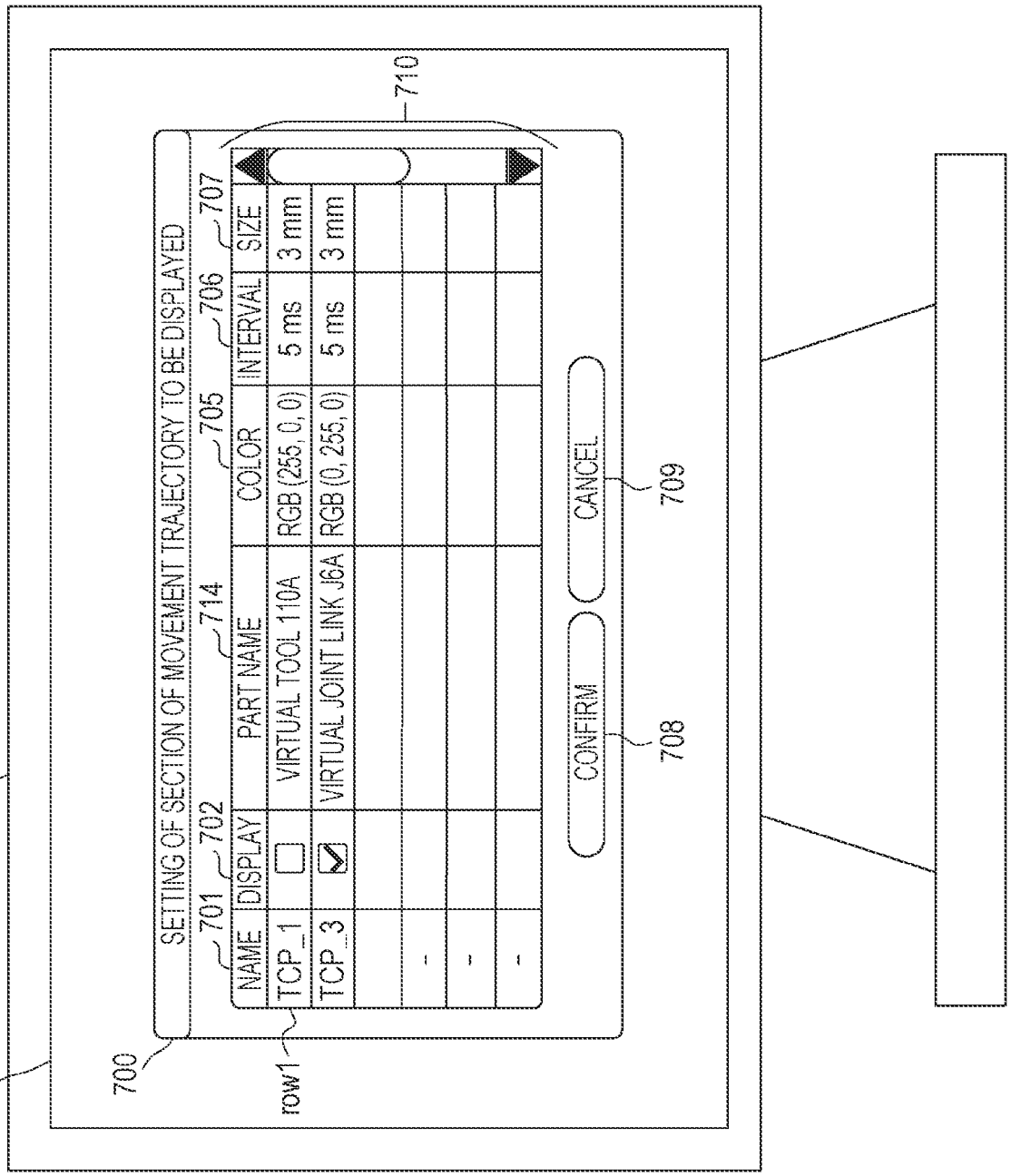
FIG. 24 is a diagram illustrating an example of a display setting screen according to one or more aspects of the present disclosure.

FIG. 24 is a diagram showing a display setting screen 700 for setting a display section in which the movement trajectory is to be displayed according to the present embodiment. A difference from the first embodiment, the second embodiment, the third embodiment, and the fourth embodiment is that a part name column 714 for describing a name of a predetermined part of the robot is displayed.

A process is performed in a similar manner as in step S700 and the user sets a manner of displaying the movement trajectory for each part of the robot based on the robot program. In FIG. 21, to display the movement of the virtual joint link J6A, a check box in a check box column 702 corresponding to the virtual joint link J6A is checked. Furthermore, in the size designation column 707, the radius of the sphere indicating the movement trajectory position is set to 3 mm. Furthermore, in the color designation column 705, the color of the virtual tool 120A is set to green. Furthermore, the display time interval is set to 5 ms in the interval designation column 706.

Figure 25:
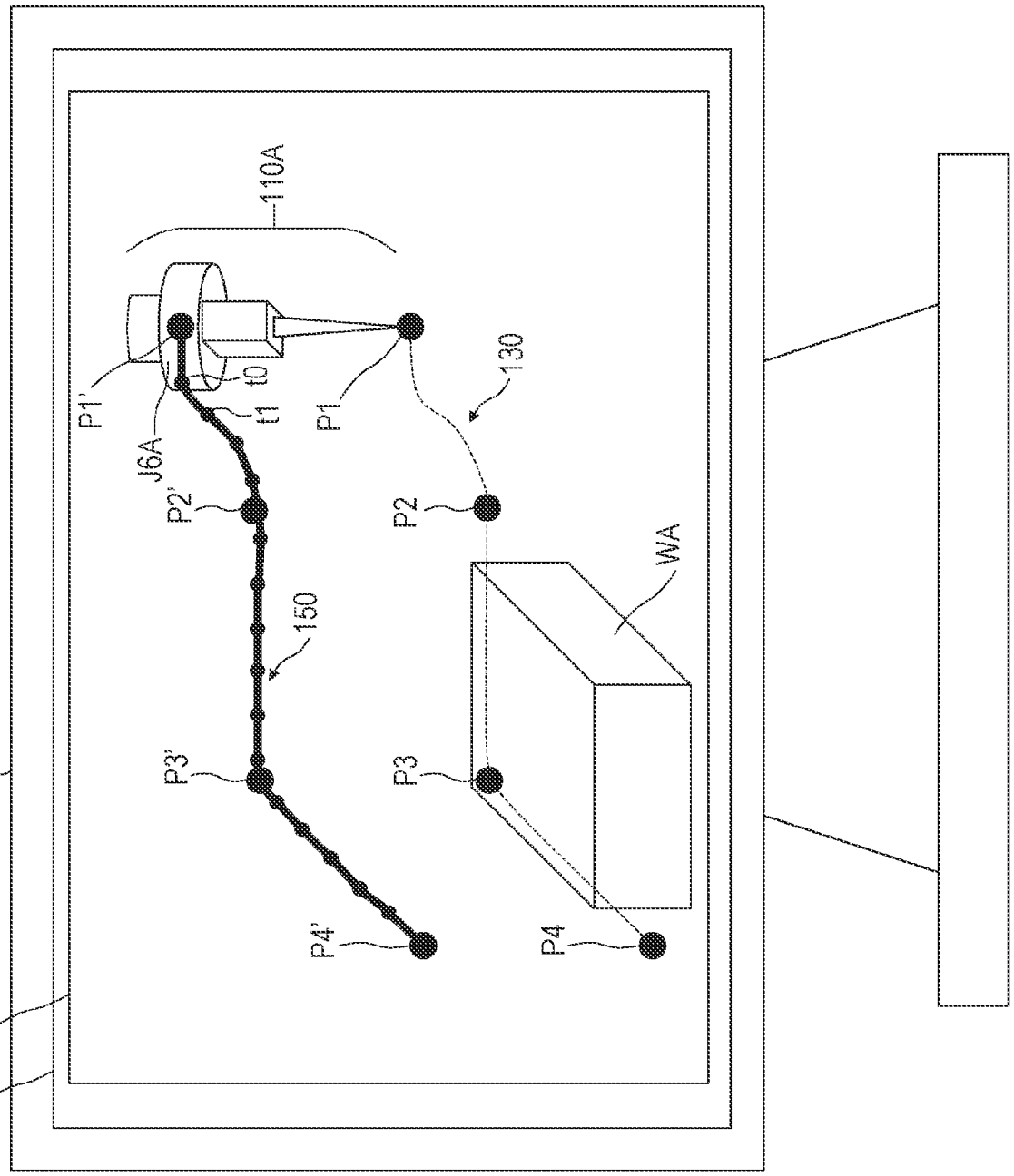
FIG. 25 is a diagram showing an example of a movement trajectory displayed based on display setting made on the display setting screen according to one or more aspects of the present disclosure.

FIG. 25 is a diagram showing the movement trajectory displayed according to the display setting made on the display setting screen 700 according to the present embodiment, Processes are performed in a similar manner as in steps S400 and S500 to calculate the movement trajectory and perform the display setting on the display setting screen 700, According to the calculation result and the display setting, movement trajectory positions are displayed at intervals of 5 ms on the trajectory 150 of the movement of the virtual joint link J6A from the training point P1' to the training point P4'. The movement trajectory positions are displayed in green with a radius of 3 mm. Lines that interpolate between the movement trajectory positions are also displayed in green.

As described above, according to the present embodiment, the user is allowed to display the movement trajectory of the robot only for the part of the robot the user wants to see. This makes it possible for the user to easily grasp the movement of the robot that the user wants to see, and thus it becomes possible to efficiently modify the training points of the robot and the robot program. Even in a case where additional robots are installed in a factory and thus the factory becomes complicated, displaying a trajectory of a movement of each part of the robot the user wants to see according to the present embodiment makes it possible to grasp, with great easiness, the movement of the robot that the user wants to see. Since it is possible to easily grasp the movement of various parts of the robot in addition to the movement of tools, it becomes possible to efficiently modify a layout of apparatuses installed around the robot.

The present embodiment has been described above taking the virtual joint link J6A as an example, but the present embodiment may be applied to the displaying of the movement of another joint link. In a case where an apparatus such as a camera is provided on the end effector of the robot, the movement of the camera may be displayed according to the present embodiment.

In the present embodiment, for convenience of explanation, trajectories and training points which are not specified to be displayed are represented by broken lines, but, to improve visibility, the trajectories and the training points which are not specified to be displayed may be hidden.

Sixth Embodiment

Figure 26:
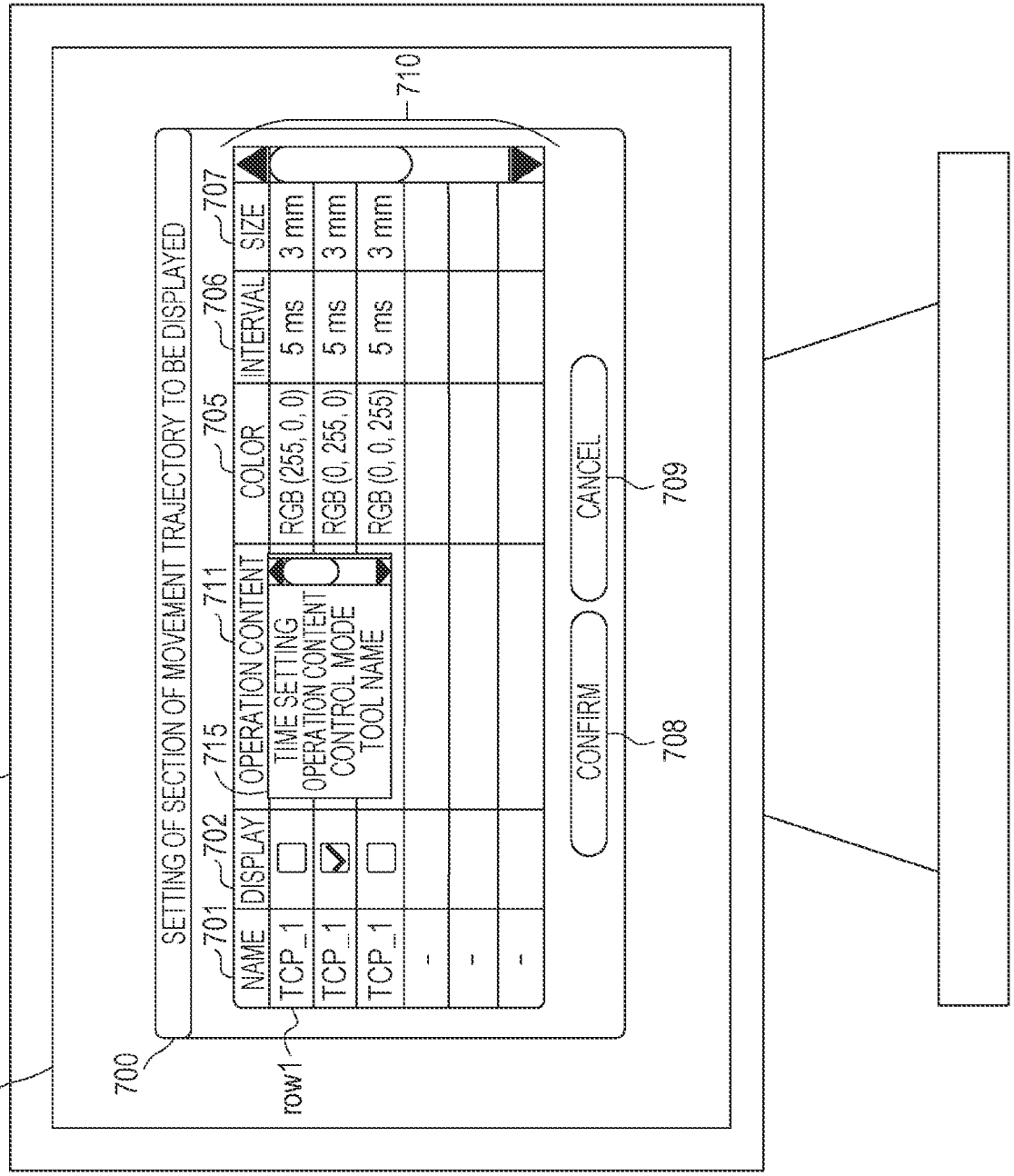
FIG. 26 is a diagram illustrating an example of a display setting screen according to one or more aspects of the present disclosure.

FIG. 26 is a diagram illustrating an example of the display setting screen 700 according to a fifth embodiment. In the following description, explanations are focused on parts of the hardware and the control system different from those according to the first, second, third, fourth, and fifth embodiments. Similar parts and operations to those described in the previous embodiments can be configured in a similar manner so as to have similar functions, and a further detailed description thereof will be omitted.

As shown in FIG. 26, the display setting screen 700 according to the present embodiment is different from those according to the previous embodiments in that a pull-down menu 715 is displayed for selecting a viewpoint (a criterion) from which a trajectory is to be displayed. In the pull-down menu, it is allowed to select a display mode from a list including: displaying based on time setting; displaying based on operation content; displaying based on control mode; displaying based on tool name (robot name); and displaying based on part name. In FIG. 26, the pull-down menu 715 appears when the operation content display column 711 for describing a point of view item is clicked with the mouse 304.

Thus, the user is allowed to easily set the viewpoint as the user wants. This makes it possible for the user to easily grasp the movement of the robot from the viewpoint selected by the user, and thus it becomes possible to efficiently modify the training points of the robot and the robot program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory, device, a memory card, and the like.

Specifically, the processing procedure in the embodiments described above is executed by a control apparatus or an information processing apparatus. Therefore, a software program capable of executing the above-described functions may be stored in a storage medium, the storage medium may be provided to an apparatus which integrally controls various control apparatuses, and a CPU which integrally executes processes may read the program from the storage medium and may execute the read program thereby achieving the above-described functions. In this case, the program read from the storage medium implements the functions of the embodiments described above, and the program and the storage medium on which the program is stored fall within the scope of the present disclosure.

In the embodiments described above, it is assumed that a ROM, a RAM, or a flash ROM is used as the computer-readable storage medium in which the program is stored. However, this is merely by way of example but not limitation. The program for carrying out the present disclosure may be stored in any storage medium as long as it is a computer-readable storage medium. For example, as a storage medium for supplying a control program, an HDL), an external storage device, a storage disk, or the like may be used.

In the various embodiments described above, it is assumed by way of example but not limitation that the robot arm body 100 is an articulated robot arm having a plurality of joints. Note that the number of joints is not limited to the examples employed in the various embodiments. In the embodiments described above, the robot arm having the vertical multi-axis configuration is employed. However, other robot arms having joints of different types from that employed in the above-described embodiments such as a horizontal articulated type, a parallel link type, a Cartesian robot, or the like may be employed.

In the various embodiments described above, the coating operation, the welding operation, and the cutting operation have been described as examples of operations performed on the work W, but the operations are not limited to these examples. For example, various operations such as a gripping operation for gripping the work W, a fastening operation for fastening by screw tightening, a polishing operation for polishing, etc. may be performed.

The various embodiments described above can be applied to a machine capable of automatically performing expansion/contraction, bending/stretching, vertical movement, left/right movement, turning operation, or a combination thereof based on information stored in a storage apparatus provided in a control apparatus.

The present disclosure is not limited to the above-described embodiments, and many modifications can be made within the technical scope of the present disclosure. The effects described in the embodiments Hof the present disclosure are merely examples arising from the present disclosure, and the effects of the present disclosure are not limited to those described in the embodiments of the present disclosure. Note that at least two or more different embodiments described above may be combined and implemented.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-098470 filed Jun. 14, 2021, which is hereby incorporated by reference herein in its entirety.

What is claimed is:

1. An information processing apparatus comprising:
a processor configured to:
display, on a display unit, information on a plurality of operations of a robot the plurality of operations including at least a first operation and a second operation, the first operation being an operation in which the robot executes handling on a target object, the second operation being an operation in which the robot approaches the target object;
set a region where the robot passes when the robot executes a part of the plurality of operations;
set, in a trajectory regarding the robot, a portion determined as being within a range of the region as a first trajectory, and set at least a part other than the first trajectory in the trajectory as a second trajectory; and
partially display the trajectory by displaying the first trajectory or the second trajectory,
wherein the processor automatically divides the trajectory into the first trajectory corresponding to the first operation and the second trajectory corresponding to the second operation based on a predetermined rule related to operation types of the plurality of operations.

2. The information processing apparatus according to claim 1, wherein based on time, the processor partially displays the trajectory.

3. The information processing apparatus according to claim 2,
wherein a user sets a first time and a second time, and
wherein the processor displays a part of the trajectory from the first time to the second time on the display unit.

4. The information processing apparatus according to claim 1,
wherein the processor sets the region so as to cover a predetermined surface of the target object and have a predetermined height, and
wherein the processor sets the first trajectory and the second trajectory based on an interference between the region and the robot.

5. The information processing apparatus according to claim 4,
wherein based on, in the trajectory, a portion that transitions from an outside of the region to an inside of the region or from the inside of the region to the outside of the region, and
wherein the processor sets the first trajectory and the second trajectory.

6. The information processing apparatus according to claim 1, wherein the handling includes one of following operations: a coating operation for applying a coating material to the target object; a welding operation for welding the target object; a fastening operation for fastening the target object; a cutting operation for cutting the target object; a gripping operation for gripping the target object; and a polishing operation for polishing the target object.

7. The information processing apparatus according to claim 1, wherein based on a control mode of the robot, the processor partially displays the trajectory.

8. The information processing apparatus according to claim 7, wherein the control mode includes a position control mode for controlling the robot based on position information, and a force control mode for controlling the robot based on force information.

9. The information processing apparatus according to claim 1,
wherein the robot includes a first robot and a second robot, and
wherein based on the first robot and the second robot, the processor partially displays the trajectory.

10. The information processing apparatus according to claim 1, wherein based on a predetermined part of the robot, the processor partially displays the trajectory.

11. The information processing apparatus according to claim 1, wherein based on a criterion selected by a user from a plurality of criteria, the processor partially displays the trajectory.

12. The information processing apparatus according to claim 11, wherein the criteria includes at least one of following criteria: a criterion related to time; a criterion related to a content of an operation; a criterion related to a control mode; a criterion related to a name of the robot; and a criterion related to a predetermined part of the robot.

13. The information processing apparatus according to claim 12,
wherein the criterion is selectable from criteria given in the form of a pull-down menu, and
wherein the selected criterion is used to automatically divide the trajectory into the first trajectory and the second trajectory.

14. The information processing apparatus according to claim 1, wherein the processor displays a position of the robot at a predetermined time interval on the part of the trajectory of the movement related to the operation of the robot.

15. The information processing apparatus according to claim 14, wherein the processor can set the time interval.

16. The information processing apparatus according to claim 14, wherein the processor displays each of the positions by a first model having a predetermined shape.

17. The information processing apparatus according to claim 16, wherein the processor can set at least one of the predetermined shape, a color of the predetermined shape, and a size of the predetermined shape.

18. The information processing apparatus according to claim 16, wherein the processor displays a second model representing a line segment so as to connect between the first models.

19. The information processing apparatus according to claim 14, wherein the position is a part of an end effector provided on the robot, the part configured to execute the handling on the target object.

20. A robot system comprising the information processing apparatus according to claim 1 and a real robot corresponding to the robot.

21. An article production method, comprising: creating data for controlling a real robot corresponding to the robot by using the information processing apparatus according to claim 1; and producing an article by controlling the real robot based on the data.

22. The information processing apparatus according to claim 5,
wherein regarding an operation that the robot executes on a target object, a plurality of trajectory positions where the robot is to be located is set in the trajectory, and
wherein the second trajectory includes a trajectory position within a range of the region at which the portion transitions from the outside of the region to the inside of the region or a trajectory position within a range of the region at which the portion transitions from the inside of the region to the outside of the region.

23. The information processing apparatus according to claim 1, wherein the processor divides the trajectory into the first trajectory and the second trajectory automatically.

24. The information processing apparatus according to claim 1,
wherein the trajectory relates to the plurality of operations that the robot executes on a target object; and
wherein the processor sets the region on the target object.

25. The information processing apparatus according to claim 11, wherein the criterion is an item regarding a viewpoint of user's interest in the trajectory of the operation of the robot.

26. An information processing method for displaying information on an operation of a robot, comprising:
displaying, on a display unit, information on a plurality of operations of a robot the plurality of operations including at least a first operation and a second operation, the first operation being an operation in which the robot executes handling on a target object, the second operation being an operation in which the robot approaches the target object;
setting a region where the robot passes when the robot executes a part of the plurality of operations;
setting, in a trajectory regarding the robot, a portion determined as being within a range of the region as a first trajectory, and setting at least a part other than the first trajectory in the trajectory as a second trajectory;
partially displaying the trajectory by displaying the first trajectory or the second trajectory; and
automatically dividing the trajectory into the first trajectory corresponding to the first operation and the second trajectory corresponding to the second operation based on a predetermined rule related to operation types of the plurality of operations.

27. A non-transitory computer-readable recording medium storing a program that causes a computer to perform an information processing method for displaying information on an operation of a robot, the method comprising:
displaying, on a display unit, information on a plurality of operations of a robot the plurality of operations including at least a first operation and a second operation, the first operation being an operation in which the robot executes handling on a target object, the second operation being an operation in which the robot approaches the target object;
setting a region where the robot passes when the robot executes a part of the plurality of operations;
setting, in a trajectory regarding the robot, a portion determined as being within a range of the region as a first trajectory, and setting at least a part other than the first trajectory in the trajectory as a second trajectory;
partially displaying the trajectory by displaying the first trajectory or the second trajectory; and
automatically dividing the trajectory into the first trajectory corresponding to the first operation and the second trajectory corresponding to the second operation based on a predetermined rule related to operation types of the plurality of operations.

* * * * *